(12) United States Patent
Pabla et al.

(10) Patent No.: US 8,886,243 B1
(45) Date of Patent: Nov. 11, 2014

(54) ORCHESTRATED GROUP COMMUNICATION

(75) Inventors: Kuldipsingh A. Pabla, San Jose, CA (US); Calvin J. Cheng, Cupertino, CA (US); Frank E. Ludolph, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 2294 days.

(21) Appl. No.: 11/124,305

(22) Filed: May 6, 2005

(51) Int. Cl.
*H04B 7/00* (2006.01)

(52) U.S. Cl.
USPC ............................................................ 455/518

(58) Field of Classification Search
CPC .......... H04W 4/06; H04W 4/14; H04W 80/10
USPC ........................................................ 455/518
See application file for complete search history.

(56) References Cited

U.S. PATENT DOCUMENTS

| | | | |
|---|---|---|---|
| 6,618,763 B1 * | 9/2003 | Steinberg | 709/246 |
| 6,957,229 B1 | 10/2005 | Dyor | |
| 7,031,700 B1 | 4/2006 | Weaver et al. | |
| 7,047,030 B2 | 5/2006 | Forsyth | |
| 7,054,621 B2 * | 5/2006 | Kennedy | 455/416 |
| 2003/0037112 A1 | 2/2003 | Fitzpatrick | |
| 2005/0037785 A1 * | 2/2005 | Chen | 455/466 |
| 2005/0186970 A1 * | 8/2005 | Yates et al. | 455/456.5 |
| 2006/0223553 A1 * | 10/2006 | Reisgies | 455/466 |

OTHER PUBLICATIONS

Amir, et al; "Scaling Secure Group Communication Systems: Beyond Peer-to-Peer"; Proceedings of DISCEX3, Washington D.C.; Apr. 22-24, 2003; 12 pages.

* cited by examiner

*Primary Examiner* — Ankur Jain
(74) *Attorney, Agent, or Firm* — Robert C. Kowert; Meyertons, Hood, Kivlin, Kowert & Goetzel, P.C.

(57) ABSTRACT

Orchestrated group communication may facilitate communication with a group of contacts. A user may define a group of contacts reachable via different communication mechanisms. A communication framework may determine an appropriate method for communicating the information to each member of a group. The user may not know how the communication framework is communicating with each group member. A user may specify preferred communication mechanisms or a particular order of communication mechanisms for communicating with particular contacts. Orchestrated group communication may also provide a user interface allowing a user to request communication with every member of a contact group via a single user interface action. A user desiring to communicate with a group may drag a document, or other file, and drop it onto an icon for the group and a group communication framework may communicate that document to each member of the group.

21 Claims, 34 Drawing Sheets

ORCHESTRATED GROUP COMMUNICATION

BACKGROUND OF THE INVENTION

1. Field of the Invention

This invention relates to electronic communication and, more particularly, to electronic communication to or within a group.

2. Description of the Related Art

Current computer systems generally include many communication applications and tools. Each communication application generally performs a single type of communication and a user frequently must launch each application or tool individually, even when multiple applications or tools are required for a single communication task.

When a user needs to communicate with a particular person, he may have to open several different communication applications, each of which maintains its own set of contact information, in order to determine an appropriate communication mechanism for communicating with the desired recipient. Additionally, duplicate information for a single person may be maintained by more than one communication application. When contact information for such a person changes, the user generally must remember that more than one application maintains information about that person and manually update the information in each application. The number of human errors that may occur when manually updating multiple copies of contact information often results in two different communication applications including different versions of contact information for a single person.

Furthermore, the contact lists of each communication application must be searched separately and individually, since generally different communication applications cannot search each other's contact lists. Communication applications often have limited capabilities to sort or search through contact information. Therefore, locating contacts often requires a user to manually sort or search contact information in several applications.

Different communication applications frequently present different user interfaces to the user and consequently there is no unified interface for viewing and accessing communication related information. A user generally has to learn the user interface for each communication application individually and frequently more than one user interface is required to perform communication related tasks.

Traditionally, a user wishing to communicate with a group of contacts must determine a specific mechanism for communicating with each contact. Frequently, different communication channels must be used to communicate with different members of the group. For example, one person may only be available via instant messaging, while another may only be available via email. Thus, a sender wishing to communicate with the entire group may have to utilize several different communication applications in order to communicate the same information to every member of the group.

Additionally, one or more members of the target group may use multiple communication channels, such as both home and office email and instant messaging. Determining the most appropriate communication mechanism through which to contact a single individual may be difficult and time consuming. Determining appropriate communication mechanisms for each member of a group greatly increases both the difficulty to and time required to communicate with the entire group.

One traditional method of electronically communicating information to a group of contacts is to place the information, such as a document, in a shared location to which all of the contacts have access and to then notify each contact regarding the location of the shared information. However, the sender must still determine how to send the notification and location information to each contact. Thus, this solution merely moves the difficulty from communicating the actual information to communicating the notification regarding the information. Alternatively, a group of contacts may all be required to use the same communication mechanism (e.g. everyone in the group must use email) in order to facilitate group communication. However, forcing everyone to use a single communication mechanism is frequently too limiting to be practical.

SUMMARY

Electronically communicating information to a group of contacts may be performed via orchestrated group communication, as described herein. Orchestrated group communication may allow a user to rely upon a communication framework to determine appropriate communication mechanisms for communicating with members of a target contact group and to communicate with each member via those determined communication mechanisms. For example, a user may define a group of contacts, each of which may be reachable via different communication mechanisms. When the user wishes to communication with members of the target group, the user may request that the communication framework communicate the relevant information, such as a document, to the group. The communication framework may then determine an appropriate method for communicating the information to each member of the target group. For instance, in one embodiment, the communication framework may send the document to some of the contacts via a Peer-to-Peer file transfer mechanism, while using other communication mechanisms to communicate with other members of the group, such as via instant messaging or email attachment. The communication framework may chose different communication mechanisms for different members of the group based on information about each group member, such as presence or availability information. The user may not have any knowledge (at least beforehand) regarding how the communication framework is communicating with each group member. In some embodiments, however, a communication framework may be configured to allow a user to specify preferred communication mechanisms or a particular order of communication mechanisms for communicating with particular contacts. In other embodiments, however, the communication framework may programmatically determine various mechanisms for communicating with a contact.

Orchestrated group communication may also provide a user interface allowing a user to request communication with every member of a contact group via a single user interface action. For example, in one embodiment, a group communication framework may present an icon representing a particular group of contacts. A user desiring to communicate with every member of the contact group may, in some embodiments, drag a document, or other file, and drop it onto the contact group icon. In other embodiments, a user may request orchestrated group communication in other ways, such as by selecting a contact group from a list including multiple contact groups, or by creating an ad-hoc group by specifying or selecting individual contacts. In response to the user requesting the communication of a documents to a group, such as by dropping the document on the group icon, the group communication framework may communicate that document to each member of the contact group, as mentioned above.

Figure 1:
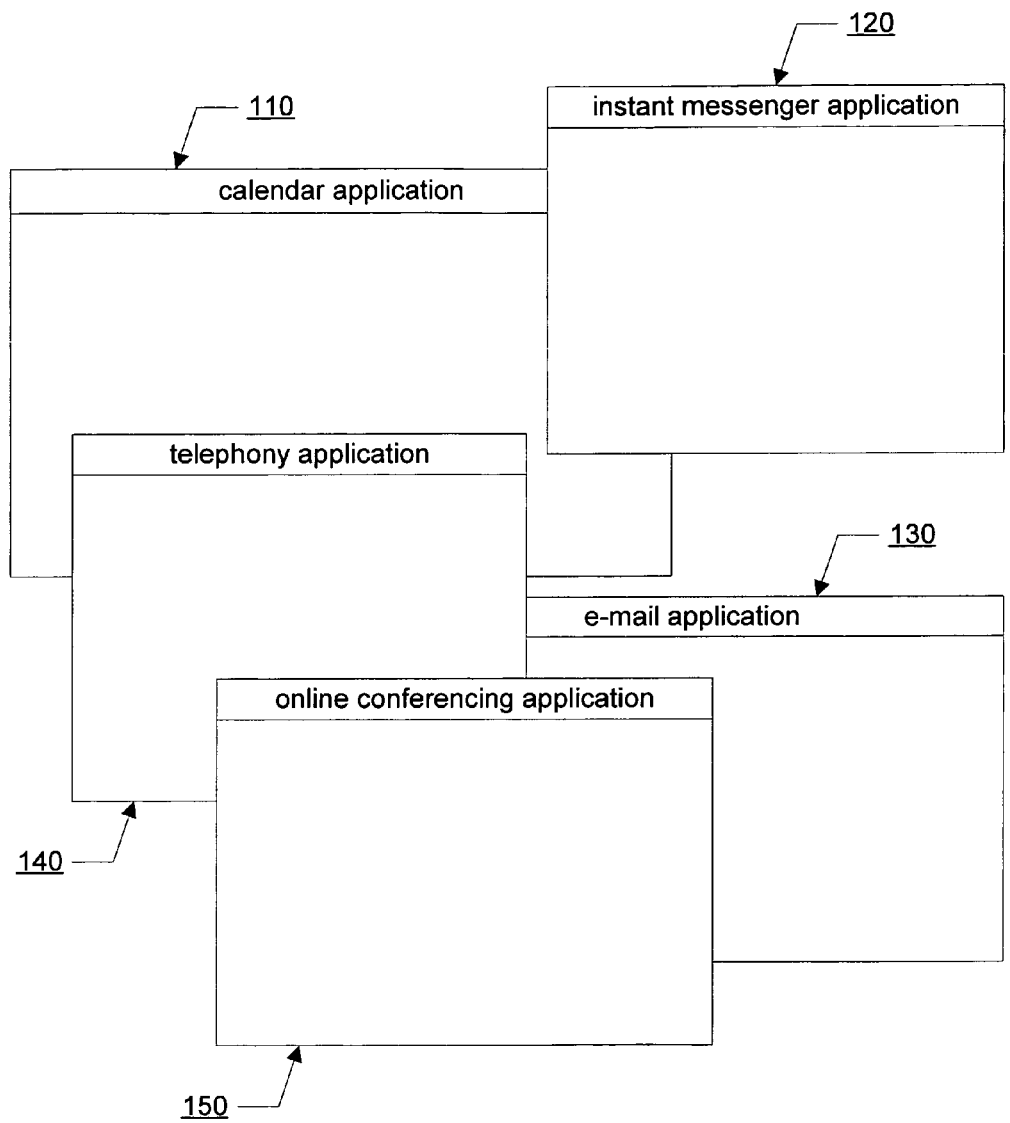
FIG. 1 is a block diagram illustrating, according to the prior art, various communication related applications.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Electronically communicating information to a group of contacts may be performed via orchestrated group communication, as described herein. A communication framework may be configured to programmatically determine an appropriate communication mechanism for communication with each of a group of contacts. A user desiring to communicate with the group of contacts may not have to determine or even know the specific mechanisms used to communicate with each member of the group. Instead, the user may instruct or request (e.g., via a user interface) an orchestrated group communication framework to communicate with each member of the group. For example, a user may request that a document be sent to members of a previously defined group of contacts. The communication framework, in response, may determine presence and/or availability and/or reachability information for each of the contacts, and from the presence/availability/reachability information determine an appropriate communication mechanism or channel via which to transmit the document for each of the various contacts in the contact group. The communication framework may transmit the document (or any other form of information) to different contacts via different communication mechanisms or channels. Additionally, the communication framework may use multiple communication channels to communicate the same information to a single contact. For instance, in one embodiment, the communication framework may send a document to a contact as an email attachment and via a peer-to-peer FTP protocol. In another example, the communication framework may communicate a document via a peer-to-peer FTP protocol, while also sending textual information, such as a message from the sender regarding the document, via instant messaging.

Various methods of requesting orchestrated group communication may be implemented. For example, in one embodiment, groups of contacts may be represented by single icons on a user's desktop and a user may be able to "drag-and-drop" a file (or multiple files) onto a contact group's icon in order to request the transmission of the file to each member of the contact group. Alternatively, a contact group's icon may be configured to provide or present a pop-up menu allowing a user to request communication with each member of the contact group.

While, in some embodiments, the communication framework may require that a user define contact groups before communicating with them, in other embodiments, a user may be able to use orchestrated group communication with an ad-hoc contact group. For example, in one embodiment, the communication framework may be configured to allow a user to select multiple, individual contacts, such as by selecting a group of single contact icons with a mouse, and request orchestrated group communication for the ad hoc contact group defined by the multiple selection. The communication framework may determine appropriate communication mechanisms for communicating with each member of the ad-hoc group in the same manner as it would for a pre-defined contact group. In yet other embodiments, the communication framework may provide, or present, a user interface allowing a user to select various contacts by name (e.g. JohnM, MaryH, Customer Service, etc) that also provides an interface for specifying the information (e.g. text message, image files, etc) to be communicated to each member of the group.

In some embodiments, a contact group may include another contact group as a member. Thus, in some embodiments, the communication framework may be configured to expand nested contact groups and communicate with each member of the main contact group as well as each member of contact groups included in the main contact group.

In some embodiments, the communication framework may determine the availability of a contact via its own internally maintained availability and contact information. For example, the communication framework may be configured to allow a user to define the various methods via which a contact may be reached (e.g. email address, IM nickname or ID, Peer2Peer address, text messaging phone number, etc.) In other embodiments, however, the communication framework may access and/or collect presence/availability/reachability information from other sources, such as a shared, network accessible, contact directory or other communication applications. For example, in one embodiment, the communication framework may be configured to access email addresses for contacts from an email application. Similarly, the communication framework may be configured to access the instant messaging identifiers for contacts from an instant messaging application.

When determining an appropriate communication mechanism via which to communicate with a particular contact, the communication framework may be configured to analyze availability information for that contact to determine whether that contact is likely to be reachable via each communication mechanism at that particular time. For example, if the communication framework has both a work and home email address for a contact, the framework may select from between them based on the current time of day. Additionally, the communication framework may be configured to select a communication mechanism that generally has faster delivery times than one that generally provides a slower delivery (e.g. selecting instant messaging over email messaging).

In some embodiments, the communication framework may be configured to communicate with other such frameworks across networks in order to help determine possible communication mechanisms for delivering information to various contacts. In one embodiment, multiple communication frameworks may be configured to share availability and reachability information with other. For instance, the communication framework may send query messages to other frameworks to determine if the other frameworks have any availability or reachability information for a particular contact or contacts. Alternatively, multiple communication frameworks may collectively maintain a shared directory of availability and reachability information for a set of contacts. For example, an organization may install a communication framework on each person's workstation and configure each framework to maintain contact information (including availability and reachability information) in a single, shared directory (or database) on a shared network server. Thus, a user may be able to communicate with contacts for which the user has no direct knowledge regarding communication mechanisms via which those contacts are available.

In some embodiments, the communication framework may be configured to first determine whether or not a contact is currently available via any communication mechanism. In one embodiment, the communication framework may be configured to access calendar and/or appointment information for a recipient, such as via a shared appointment calendar, to determine whether the recipient is current available via specific communication channel. For example, the communication framework may be configured to access calendar information for a recipient and may determine that the recipient is out of the office all day, and in response the framework may not attempt to communicate with the recipient via instant messaging, according to one embodiment. If, in another embodiment, the framework determines that a contact is not currently available, the framework may present various options to the sender. For example, the sender may elect to have the framework keep attempting to communicate the information to the contact, perhaps once every hour until the contact is available. In another embodiment, the framework may be configured to allow the user to specify a different communication mechanism or channel to use.

Additionally, in some embodiments, the communication framework may be configured to try multiple communication mechanisms in turn until one is found that can successfully deliver the information. For example, in one embodiment, the communication framework may be configured to first attempt to deliver information via a peer-to-peer file transfer protocol (P2P-FTP), but if that is not successful to try instant messaging, but if the recipient is not currently online, to send the information via email. In some embodiments, as discussed below in more detail, the communication framework may be configured to allow a user to define the order in which to try various communication mechanisms. In other embodiments, however, the communication framework may also try different communication mechanisms in an order based upon characteristics of the communication mechanisms. For instance, in one embodiment, the communication framework may be configured to try communication mechanisms in order according delivery speed (e.g., those that communicate in near real time first and those with delayed delivery last). Thus, P2P networking mechanisms may be tried first and email last.

Additionally, in some embodiments, the communication framework may be configured to allow a user to define policies specifying how to deliver data/information to particular contact. In certain embodiments, the communication framework may be configured to allow a user to define policies specifying how to deliver different types of information/data to a contact. For instance, one policy might specify different communication mechanisms for different types of data, while another policy might specify different communication mechanisms for different amounts or sizes of data. For example, in one embodiment, a user may define a policy that specifies that data under a certain size should be delivered as an instant message, while larger amounts of data should be delivered via P2P-FTP. In another example, large amount of data may be delivered via on communication mechanism, such as P2P-FTP, and a separate message, either from the user sending the information or from the communication framework, regarding the P2P-FTP delivery, may be delivered via a different communication channel, such as instant messaging, according to some embodiments. Alternatively, in another embodiment, a user may define a policy that specifies that textual information should be delivered via instant message, while other files, such as image or audio files, should be delivered via either P2P-FTP or as email attachments. Such polices may be defined for a single contact, a contact group, all communication, or for various ad-hoc groupings of contacts, according to various embodiments.

When delivering the information to a group of contacts, the communication framework may be configured to programmatically utilize other communication applications. For instance, the communication framework may programmatically use an email application to send email messages. Alternatively, in some embodiments, the communication framework may be configured to perform all steps involved in the particular communication mechanisms being used.

In some embodiments, the communication framework may be configured to request preferred or possible communication mechanisms from a separate framework that maintains identity and availability information for contacts. In one embodiment the communication framework may be configured to access a communication framework residing on a separate machine or device. Similarly the communication framework may, in some embodiments, be configured to access a shared contact directory located on a separate machine or device.

Thus, in one embodiment, the communication framework may receive input from the user specifying a group of contacts, request appropriate mechanisms via which to communicate with those contacts from a separate communication framework, and programmatically access different communication applications to actually send information to each contact. In other embodiments, however, the communication framework may itself maintain the contact information and also may be able to perform all aspects of communicating with contacts without access other communication applications.

While, in some embodiments, the entire functionality of the communication framework may be executed on a single user's workstation, in other embodiments, a user may execute a front end or client interface to the communication framework executing on separate device, such as on a network or web server. For instance, the communication framework may execute on a network-addressable server and may expose a programming interface, such as via RMI or another web services protocol allowing individual user's front ends (or thin clients) to request group communication via the main framework on the server. For example, a large corporation may install the communication framework on a shared corporate server that also maintains contact information. Thus, an employee of the corporation may request group communication by dragging and dropping a file onto a group contact icons in his desktop. In response, a framework front end on the employee's workstation may then communication with the main communication framework via RMI indicating both the information to be delivered and the contact group (or a list of individual contacts) to which the information should be delivered. The main communication framework service on the server may then determine how to deliver (and may also deliver) the information to each of the contacts on behalf of the employee's framework front end.

While contacts frequently represent people, orchestrated group communication may also used to communicate or send information to other entities. For example, in one embodiment, a contact may be an email archiving bulletin board. In other embodiments, individual contacts may represent printers, fax machines, or even automated information archival systems, etc.

Figure 2:
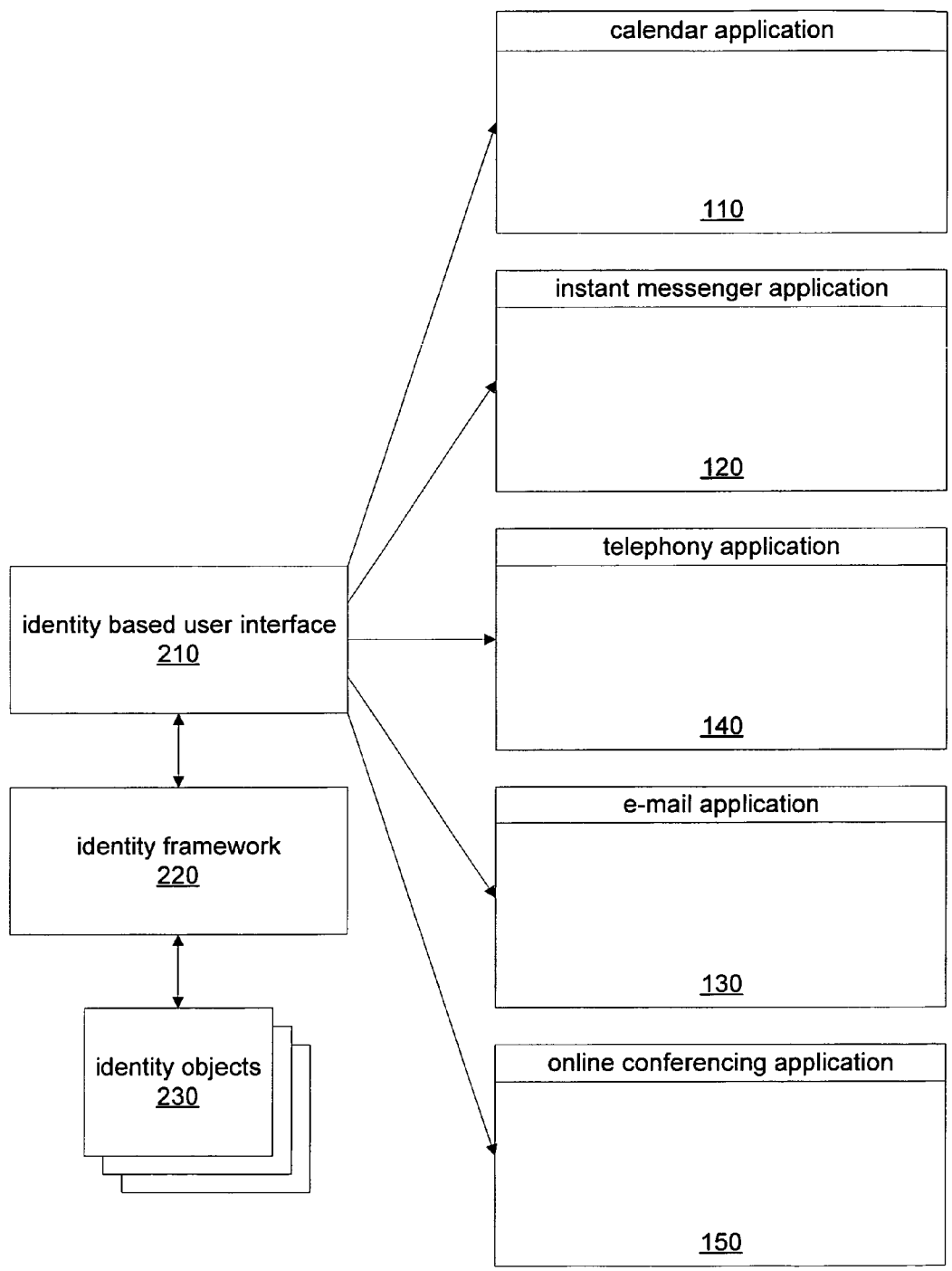
FIG. 2 is a block diagram illustrating, according to one embodiment, identity based computing.

FIG. 2 is a block diagram illustrating identity based computing, which may include orchestrated group communication, according to some embodiments. FIG. 2 illustrates one embodiment of identity based computing utilizing identity objects, an identity framework and an identity based user interface to allow users to use identities as a focal point for communication and collaborative based computing tasks. The identity framework illustrated in FIG. 2 may, in some embodiments, be a communication framework capable of orchestrated group communication, may include such a framework or may include one or more modules that implement orchestrated group communication.

As opposed to a more traditional computer use model, as illustrated by FIG. 1, identity-based computing, as according to certain embodiments described herein, may allow a user to perform communication and contact related actions from an identity based focus. For example, a user may wish to communicate with a colleague, but may not know specifically how that colleague is reachable. In conventional systems, as illustrated in FIG. 1, such a user may have to execute several different communication applications before discovering which of those may be able to communicate with the particular colleague. In certain embodiments of identity-based computing, such a user may interact with an identity-based processes, such as identity based user interface 210, to view identity and communication awareness information, such as presence, availability and reach-ability, about the colleague and may, in one embodiment, initiate communication with the colleague through such an identity based application or process. In other embodiments, identity based user interface 210 may be configured to present user interface elements represent groups of contacts and may also allow a user to request communication with every member of a contact group via a single action (e.g. dragging and dropping a file onto a contact group icon.

Please note that identity and communication awareness information may, in some embodiments, also include information related to, or regarding an identity's presence, reachability, accessibility, or current and future availability. Additionally, the terms "identity information", "communication awareness information", "presence", "availability", "accessibility", and "reach-ability" as used herein may be used interchangeably and may also refer to various combinations of such terms and information, according to different embodiments. It should also be noted that the terms "identity framework" and "communication framework" may be used interchangeably throughout this document.

In various embodiments, both an identity framework and a communication framework may be present and the communication framework may access or interact with the identity framework when implementing orchestrated group communication. In other embodiments, however, a communication framework, or software modules that implement orchestrated group communication, may be included as part of an identity framework. Alternatively, an identity framework may include functionality to implement orchestrated group communication without including a communication framework as part of the identity framework. In general, orchestrated group communication may be implemented in a communication framework or an identity framework, as described herein. Thus, while the terms "identity framework" and "communication framework" may be used interchangeably herein, individual instances of each term may refer to an identity framework, a communication framework, or both, according to various embodiments of orchestrated group communication.

Thus, according to certain embodiments, a user may be able to view communication related information, possibly including information indicating how a particular colleague is currently reachable from a single, identity based context. In addition, various user interface elements, such as windows or dialog boxes, from different communication related applications, such as e-mail or instant messenger applications may be accessible through an identity based application or process, such as identity based user interface 210, illustrated in FIG. 2.

Identity based user interface 210 may, in some embodiments, be configured to allow a user to view identity information about or to select a specific identity, say a particular colleague, and in response to that selection, identity based user interface 210 may display information about various ways or mechanisms for communicating with the colleague. In one embodiment, identity based user interface 210 may be configured to detect and display the current availability, accessibility, or reach-ability of a particular identity. In such an embodiment, identity based user interface 210 may also be configured to display the availability of a particular identity through a particular communication method or mechanism. For example, identity based user interface 210 may be configured to maintain presence and/or availability information for a particular remote user and may periodically request the current availability of the remote user from a remote system associated with the remote user. In yet other embodiments, identity based user interface 210 may be configured to display aggregate identity information (such as availability and reachability) for a group of contacts or identities. For instance, in one embodiment, identity based user interface 210 may be configured to display user interface elements informing a user which members of a contact group are available via email, which are available via instant messaging, via text messaging, etc. Thus, in certain embodiments, a user may be able, through identity based user interface 210, to access multiple types of identity and communication information regarding one or more identities, for groups of identities, from a single identity centric application. In other embodiments, identity based user interface 210 may communication and interact with other identity frameworks and/or identity based user interfaces residing on other devices associated with an identity. For example, an identity may have identity, contact, and communication awareness information stored on a number of different devices, such as home and office computers, laptops, and PDA devices. Identity framework 220 and/or identity based user interface 210 may, in certain embodiments, be configured to detect, gather, and utilize information from such devices in order to provide complete communication aware information for an identity, or group of identities.

In certain embodiments, identity based user interface 210 may interface and interact with an identity framework, such as identity framework 220, when determining and maintaining identity information, including, among other things, presence, availability, accessibility, reach-ability, or other communication-related information. Additionally, the collected identity information may, in some embodiments, be stored in shared identity objects, such as identity objects 230, as described herein below. In such an embodiment, identity framework 220 may store aggregated identity information for an entity or identity in a shared identity object. Additionally, in some embodiments, identity framework 220 may store aggregated identity information for a group of entities or identities in a single identity object. Alternatively, in other embodiments, identity objects may be nested when used to define and store identity information for a group of identities. An identity object may store various kinds of identity information and may, in some embodiments, provide access to one or more communication mechanisms for communicating with the corresponding identity.

Thus, according to various embodiments, identity based user interface 210 may be configured to allow a user to initiate identity or communication related tasks, or applications, from a single identity based interface or context. For example, in one embodiment, identity based user interface 210 may display a list of contacts, or contact groups, from which a user may be able to access any of several communication applications directly. For instance, as illustrated by FIG. 2, identity based user interface 210 may provide access to calendar application 110, instant messenger application 120, telephony application 140, e-mail application 130, and/or online conferencing application 150, according to one example embodiment. In other embodiments, identity based user interface, and possibly identity framework 220, and identity objects 230 may be configured to access and interact with other identity or communication related applications or services. Alternatively, in yet other embodiments, identity based user interface may rely upon identity framework 220 to provide the ability to communicate with contacts without accessing other communication applications. For example, in one embodiment, identity framework 220 may be configured to be able to send email messages (or other forms of communication) directly without accessing a separate email application.

In some embodiments, an identity framework, such as identity framework 220, may be configured to recognize and interact with new communication mechanisms or applications. For example, identity framework 220 may, in one embodiment, may be configured to allow new or newly installed communication applications or services to utilized existing identity and communication awareness information and to interact with other communication applications available through identity framework 220. Thus, an identity framework may continue to integrate and aggregate identity and communication related information, applications, or services as such information, applications, or services become available.

In certain embodiments, identity based user interface 210 may be configured to allow a user to initiate a communication with an identity, or group of identities, without actually having to know specific details about the communication mechanism used to communicate with that identity. For instance, in one embodiment, identity based user interface 210 may, when displaying identity or communication information about a remote user, display a button that is labeled "e-mail this identity." In such an embodiment, a user may select such a button and, in response, identity based user interface 210 may access e-mail application 130 and programmatically fill in the identity's e-mail address. Thus, a user may be able to e-mail a colleague or other identity without having to actually know or supply the specific e-mail address. In another embodiment, identity based user interface 210 may incorporate a name or nickname for an identity when displaying communication controls and therefore may display a button labeled, "e-mail Tom." In yet other embodiments, identity based user interface 210 may display user interface elements representing groups of identities and may allow a user to request communication with each member of the group via a single user action. For example, as noted above, a user may be able to drag and drop a document onto a group icon displayed by identity based user interface 210. In response, identity based user interface 210 may programmatically communicate the document to each member of the group, possibly via different communication mechanism, without the user having to know how the document was communicated to each identity. The exact nature and information contained in user interface elements as described above may vary according to different embodiments.

Additionally, an identity based application, such as identity based user interface 210, may allow a user to select which of several communication mechanisms to use when communicating with an identity without displaying the details of the communication mechanisms. For example, identity based user interface 210 may, in certain embodiments, display different buttons or other user interface controls, indicating different possible communication mechanisms by using different potential contexts for the selected identity. For instance, in one embodiment, identity based user interface 210 may present one button labeled, "e-mail this identity at home" and present another button labeled, "e-mail this identity at work." Presenting context information rather than specific addressing information may be used with any communication mechanisms, according to various embodiments, and is not limited to use with e-mail messages. For example, in another embodiment, identity based user interface may present a button labeled, "instant messenger this identity" or "call this identity's cell phone." Thus, identity based applications and processes may be configured to allow a user to communicate through specific mechanisms without compromising any security issues related to the specific communication details for the identity.

Identity based user interface 210 may, in some embodiments, maintain identity and communication information for multiple identities or contacts. In certain embodiment, such identities may represent individuals, groups, or organizations, while in other embodiments, an identity may represent a computer device or system that is capable and configurable to receive communication or that may be interacted with though various communication mechanisms, such as e-mail, instant messaging, or over a telephone. For example, in one embodiment, a user may configure identity based user interface 210 to maintain communication information for (and communicate with) entities such as fax machines, printers, or e-mail based newsgroups, among others.

Note that while FIG. 2, illustrates an embodiment of a system using an identity based user interface, an identity framework and identity objects, in other embodiments, only an identity based user interface may be used to achieve the same level of identity based computing. In another embodiment, only an identity framework or only shared identity objects may be utilized. In other words, aspects of identity based computing may be used singly or in combination, as described herein and according to various embodiments.

Figure 3:
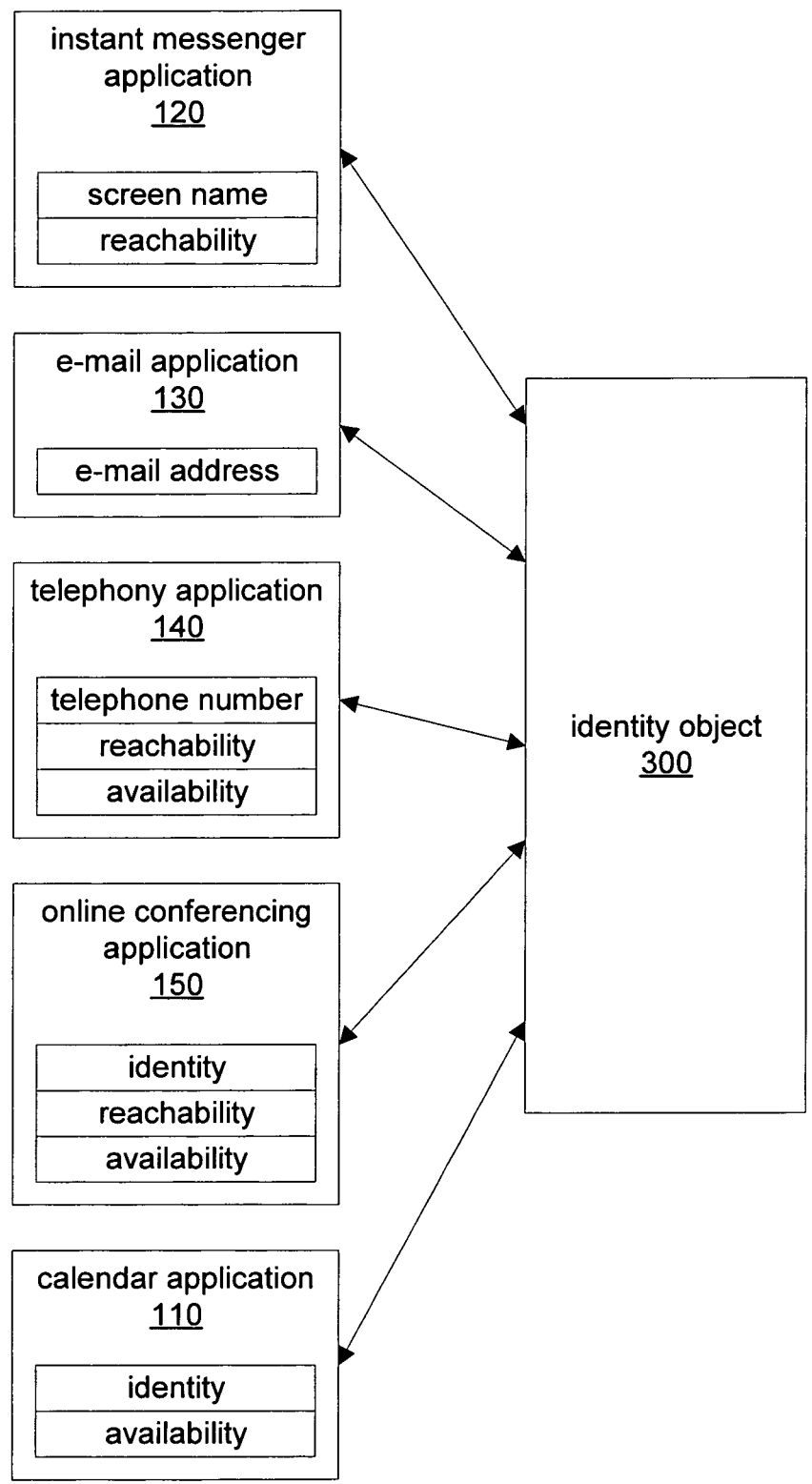
FIG. 3 is a block diagram illustrating aggregating and storing identity information in an identity object, according to one embodiment.

FIG. 3 is a block diagram illustrating aggregating and storing identity information in an identity object, according to one embodiment. When allowing a user to view and access identity and communication related information and services, multiple types of identity information for one or more identities may be stored and maintained in identity objects, according to various embodiments. Identity objects may be shared among multiple applications or processes, executing both locally and remote from the device where the identity objects reside. For example, in one embodiment, an identity object, such as identity object 300, may store various types of identity or communication related information for an identity or a group of identities. Identity object 300 may store information from various sources, such as e-mail, instant messenger, telephony, text messaging, online conferencing, or calendar applications, according to one embodiment. In other embodiments, identity object 300 may store information from yet additional sources, such as an online company directory, a searchable, central database of e-mail addresses or instant messenger screen names, a directory server, a peer-to-peer service, such as Sun Microsystems' JXTA™ product, or other identity related services.

As illustrated in FIG. 3 and according to certain embodiments, identity objects, such as identity object 300 may store or maintain identity and communication related information gathered from various sources. Thus, identity object 300 may store screen names and/or information from an instant messenger application 120, e-mail addresses from an e-mail application 130, telephone numbers, availability, and/or reach-ability information from telephony application 140, and identity and availability information from online conferencing application 150 or calendar application 110. In other embodiments, identity object 300 may store identity or communication related information manually input or configured by a user. According to certain embodiments, availability and/or reachability information may be determined for multiple communication mechanisms for a single identity. For example, a person may be currently reachable via both e-mail and telephone but not via an instant message. In some embodiments, such availability and/or reach-ability information may be maintained in a shared identity object for an identity. Additionally, identity information stored in identity object may also include information regarding when an identity is available and/or reachable via individual communication mechanisms.

Identity objects, such as identity object 300 may be shared, accessed, and interacted with by multiple different processes and applications, according to different embodiments. For example, in one embodiment, an identity aware calendar application may access identity information from a shared identity object to allow a user to communicate with someone scheduled to attend particular meeting. In another embodiment, an identity based user interface may load and display identity information from one or more shared identity objects for a user selected identity or group of identities.

Figure 4:
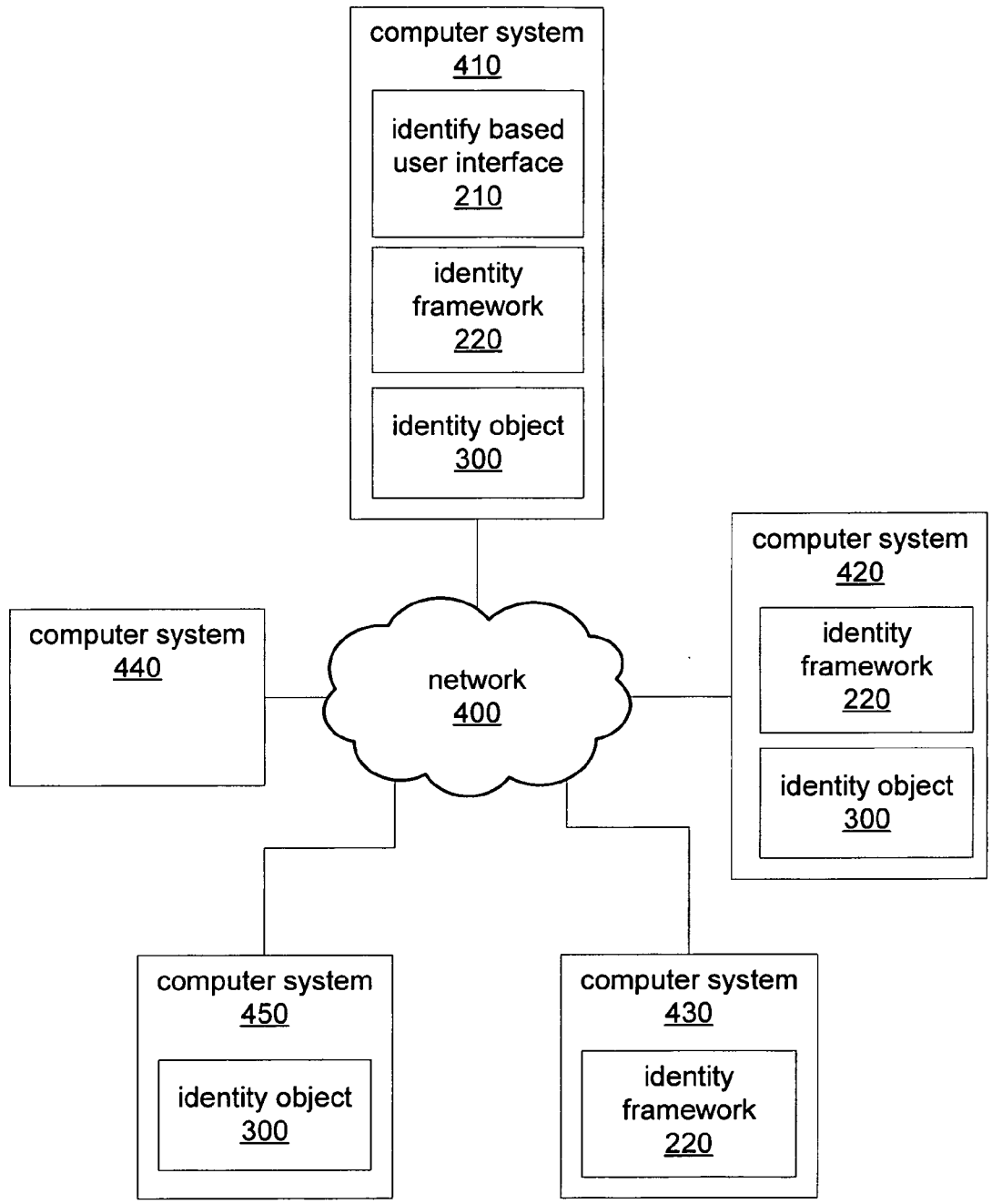
FIG. 4 is a block diagram illustrating, according to one embodiment, the sharing and exchanging of identity and communication information for identities across multiple networked computers.

FIG. 4 is a block diagram illustrating, according to one embodiment, the sharing and exchanging of identity and communication information for identities across multiple networked computers. In certain embodiments, identity based user interface 210, identity framework 220, and identity object 300 may be configured to communication with other devices connected via network 400. For instance, in one embodiment, identity framework 220 on computer system 410 may be configured to communicate with identity frameworks on computer systems 420 and/or 430. When communication with identity frameworks on other computers, identity framework 220 may be configured to request and receive identity information, including presence, availability, reachability or other communication awareness information for one or more identities, or groups of identities, according to one embodiment.

In other embodiments, identity framework 220 may be configured to discover new identities from other computer systems. In one embodiment, identity framework 220 may discover new identities through an identity framework on a remote system, while, in other embodiments, identity framework 220 may discover new identities on remote systems that are not executing identity frameworks. For example, identity framework 220 on computer system 430 may be configured to communicate with an application on computer system 440 in order to obtain identity information or to discover new identities. For instance, computer system 400 may be configured as a directory server and thus identity framework 220 may be configured to communicate and interact with such a directory server and request identity information.

Also as illustrated by FIG. 4, and according to various embodiments, an identity framework on one computer system may be configured to communicate and interact with one or more identity objects on another system. For example, computer system 450 may include one or more shared identity objects and may be configured to allow identity aware applications or processes, such as identity framework 220, to access those identity objects remotely.

Network 400, as illustrated in FIG. 4, may comprise any of various network technologies according to various embodiments. Network 400 may be a local area network, storage area network fabric, wide area network, intranet network, Internet network, or many other types of network. Network 400 may be designed to be continuously available (although network outages may occur), or may be intermittent (e.g. a modem connection made between a computer system in a user's home and a computer system in a user's workplace). Network 400 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies.

Figure 5:
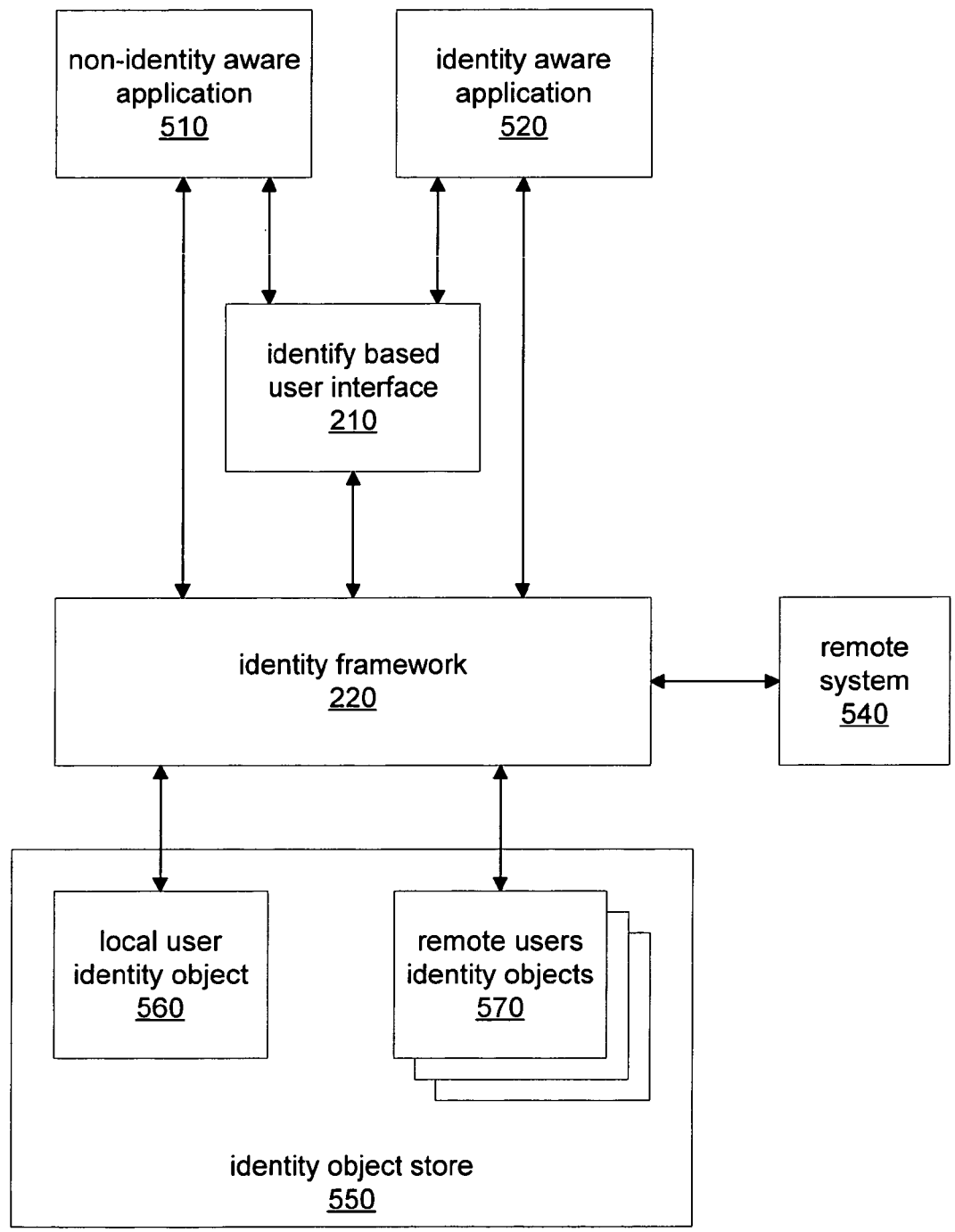
FIG. 5 is a block diagram that illustrates an identity framework storing identity information in identity objects, according to one embodiment.

FIG. 5 is a block diagram that illustrates an identity framework, according to one embodiment. An identity framework, such as identity framework 220, may provide an interface between other identity aware applications (and/or processes) and identity objects, according to some embodiments. In other embodiments, identity frameworks on different devices may communicate and collaborate with each other to aggregate identity and communication related information for a number of identities, or groups of identities.

Identity framework 220 may be configured to store identity information, in one or more identity objects, according to certain embodiments. In some embodiments, stored identity information may include, among other things, identity, presence, availability, accessibility, reach-ability and/or other communication awareness, information. In one such embodiment, identity framework 220 may be configured to utilize an object store, such as identity object store 550 to maintain identity information for one or more identities, or groups of identities. For example, identity framework 220 may, in one embodiment, determine and maintain identity information for a local user in local user identity object 560 in identity object store 550 and may make that stored information available to applications or processes on remote system 540. In another embodiment, identity framework 220 may gather identity information about remote users from remote system 540, store that information in remote user's identity objects 570 and make such information available to local applications, such as identity based user interface 210, identity aware application 520 and non-identity aware application 510.

According to certain embodiments, identity based user interface 210, identity framework 220, or identity objects, such as local user identity object 560 may be configured to communicate and interact with identity aware applications, such as identity aware application 520. In one embodiment, identity framework 220 may be configured to receive and respond to requests from local applications for identity information for a local or remote user. For example, identity aware application 520 may request availability information for a remote user from identity framework 220. In one embodiment, identity framework 220 may forward such a request to a remote system, such as remote system 540, and store the information received from remote system 540 in remote users identity objects 570, and also supply the requested availability information to identity aware application 520. In certain embodiments, identity aware application 520 may interact with identity based user interface 210 and in response identity based user interface 210 may request identity information for a user from identity framework 220. In yet other embodiments, identity aware application 520 may be able to interact directly with identity object store 550 or remote users identity objects 570 to obtain such information.

Note that non-identity aware applications, such as those represented by non-identity aware application 510, may be applications that are not configured to recognize and communicate with identity based user interfaces, identity frameworks, identity objects, or other aspects of identity based computing described herein, but may include applications that maintain and/or use contact or other user based information, such as e-mail applications, project management applications, contact management applications, and/or calendar applications, among others. According to various embodiments, identity based user interface 210 and identity framework 220 may be configured to communicate and interact with such non-identity aware applications through various means. For instance, identity framework 220 may, in one embodiment be configured to detect and recognize a standard e-mail dialog box and may be configured to automatically fill in such a dialog box with relevant identity information, such as one or more e-mail addresses. Such activity is not limited to e-mail applications, and identity framework 220 may be configured to recognize and fill in user interface elements related to other communication tasks, such as instant messaging, telephony, or online video conferencing.

Figure 6:
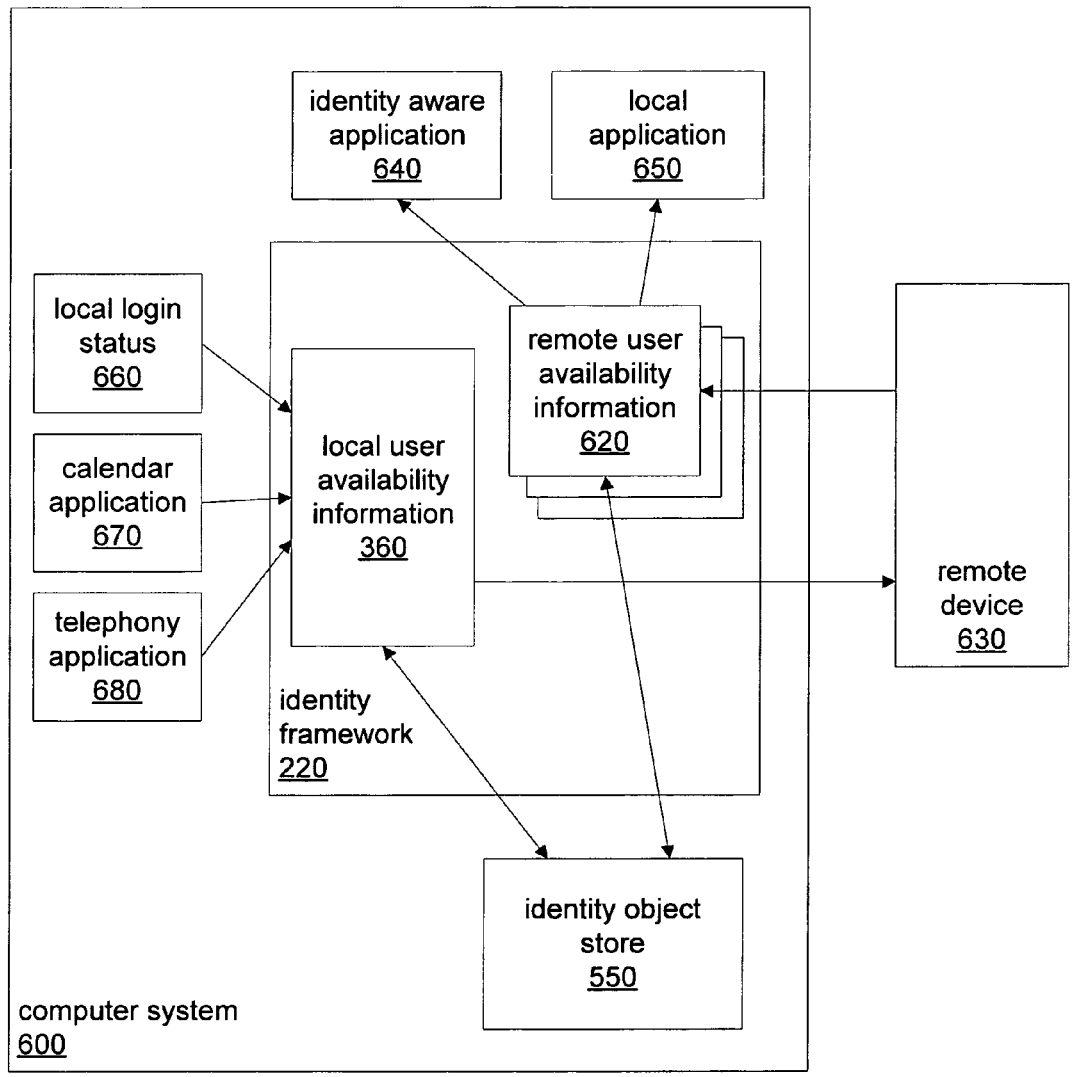
FIG. 6 is a block diagram illustrating, according to one embodiment, an identity framework gathering and storing availability information.

FIG. 6 is a block diagram illustrating, according to one embodiment, an identity framework gathering and storing availability information about one or more identities, or groups of identities. Identity framework 220, according to one embodiment, may be configured to gather identity information from various sources, such as local login status 660, calendar application 670, telephony application 680, or remote device 630 and store such information in local user availability information 360 or remote user availability information 620. Alternatively, in another embodiment, identity framework 220 may be configured to allow a user to manually add, remove or update maintained identity information. In one embodiment for example, identity framework 220 may be configured to present user interface elements allowing such manual manipulation of identity information. In another embodiment, identity framework 220 may be configured to allow an identity aware application, such as identity based user interface 210 to display or present such user interface elements allowing manual creation or manipulation of identity or communication related information.

In some embodiments, identity framework 220 may collect and store contact information for a group of identities as if they were a single identity. For example, in one embodiment, identity framework 220 may collect identity information regarding a call center or a technical support group and may maintain and store identity information for a number of individuals of such a group within a single maintained identity. Additionally, identity framework 220 may be configured to use collected identity information for individual members of a group when providing orchestrated group communication, as described herein.

In one embodiment, identity framework 220 may be configured to share identity information for one or more local identities with remote systems, such as remote device 630, and may also be configured to request and receive identity information for remote identities from remote systems. In one embodiment, identity framework 220 may request and receive identity information from another identity framework executing on remote device 630, while in other embodiments, identity framework 220 may be configured to request and receive such information directly from identity objects on remote device 630. In one embodiment, identity framework 220 may exchange identity information with an identity framework executing on remote device 630, but may also be configured to communicate with other identity services or applications on remote device 630, such as directory servers, peer-to-peer services, etc.

Identity framework may also be configured, according to certain embodiments, to supply identity information, whether for a local or remote identity, to local applications, such as identity aware application 640 and local application 650. In certain embodiments, identity framework 220 may maintain and supply identity information for users, groups or organizations, but in other embodiments, identity framework 220 may also store identity information for non-human identities such as printers, fax machines, e-mail based newsgroups, and in general any device or process able to be communicated with.

Figure 7:
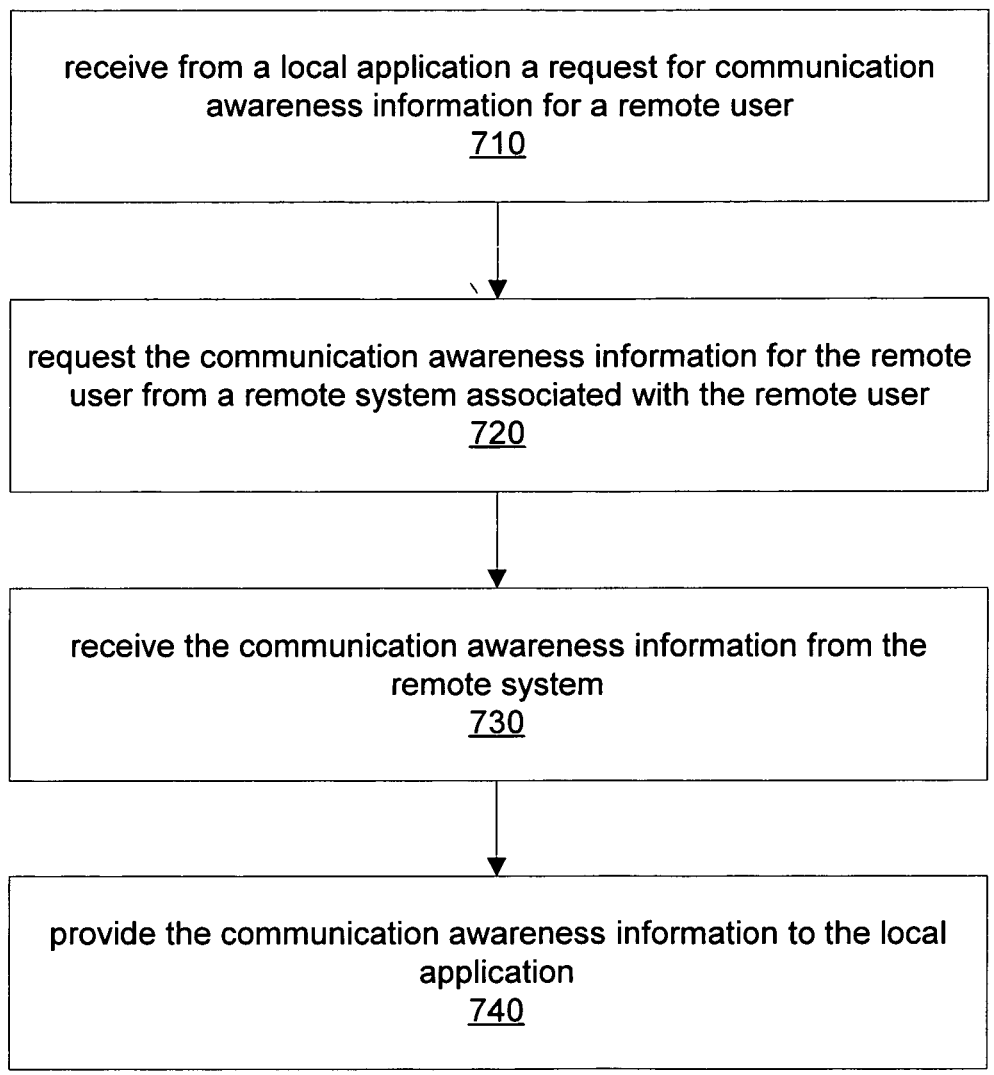
FIG. 7 is a flowchart illustrating, according to one embodiment, a method for providing communication awareness information for a remote identity to a local application.

FIG. 7 is a flowchart illustrating, according to one embodiment, a method for providing communication awareness information for a remote identity to a local application. According to one embodiment, an identity framework, such as identity framework 220, may receive from a local application a request for communication awareness information for a remote user, as illustrated by block 710. For example, an identity aware application, such as identity base user interface 210, may request such communication awareness information from identity framework 220. In turn, according to on embodiment, identity framework 220 may request the communication awareness information for the remote user from a remote system associated with the remote user, as illustrated by block 720. For instance, identity framework 220 may maintain information indicating that a specific remote system, possibly executing another identity framework, may provide communication awareness information for a particular remote user. After receiving the communication awareness information from the remote system as illustrated by block 730, identity framework 220 may then provide the communication awareness information to the local application, as illustrated by block 740, according to one embodiment.

Figure 8A:
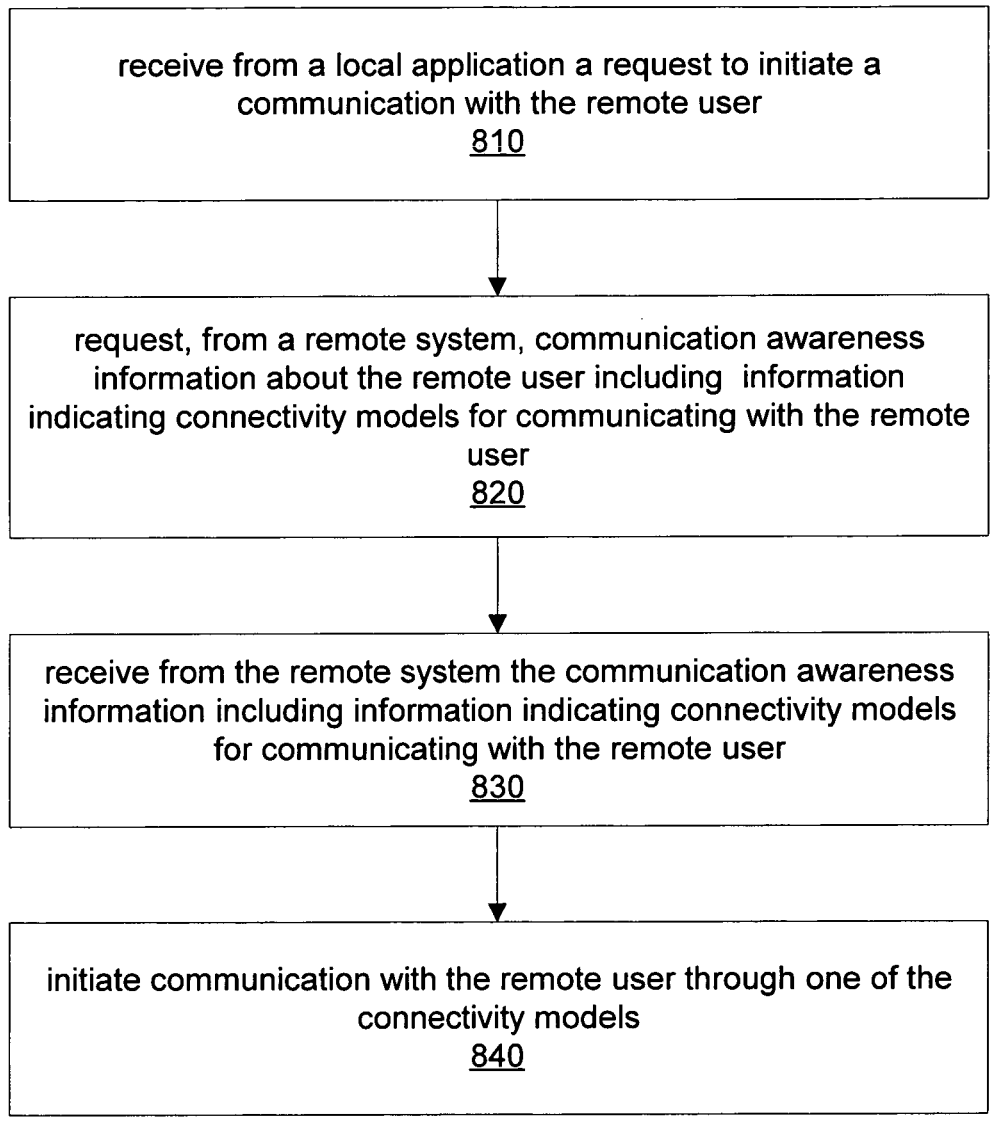
FIG. 8A is a flowchart illustrating a method for initiating communication with a remote identity through an identity framework, according to one embodiment.

FIG. 8A is a flowchart illustrating a method for initiating communication with a remote identity through an identity framework, according to one embodiment. As described herein, identity framework 220 may be configured to initiate communication with remote identities or users on behalf of local identity aware applications, such as identity based user interface 210. For example, identity based user interface 210 may, in response to user input request communication with a particular remote user, communicate with identity framework 220 to request that identity framework 220 initiate such a communication. In other embodiments, a user may request communication with a group of contacts or identities, and identity based user interface may, in turn, request that identity framework 220 initiate communication through appropriate communication mechanisms, with every member of the target group.

Thus, according to some embodiments, identity framework 220 may receive from a local application a request to initiate a communication with a remote user, as illustrated by block 810, and may in turn request, from a remote system, communication awareness information about the remote user, including information indicating connectivity models for communicating with the remote user, as illustrated by block 820. For instance, identity framework 220 may receive a request to send an email to a remote user, and may request communication awareness information about the remote user from an identity framework executing on a remote system associated with the remote user. In another example, identity framework 220 may receive a request from identity based user interface 210 to send an instant message to remote user and identity framework 220 may request from another identity framework whether or not that remote user is currently available through instant messaging and if so, through what screen name.

After receiving from the remote system the communication awareness information including information indicating connectivity models for communicating with the remote user, as illustrated by block 830, identity framework 220 may initiate communication with the remote user through one of the connectivity models, as illustrated by block 840, according to one embodiment. For instance, after receiving information from another identity framework indicating that the remote user is available through a certain instant messenger screen name, identity framework 220 may, in one embodiment, proceed to send an instant message to the remote user using the indicated screen name. Of course, in such an example, either identity framework 220 or identity based user interface 210 may allow a local user to input the message to send, according to different embodiments.

As described above, in some embodiments, identity framework 220 may maintain identity information for a group or collection of identities and may initiate communication with one or more individuals of such a group. For example, in one embodiment, a user may request communication with a technical support group and in response identity framework 220 may initiate communication with one individual of the group based upon received communication awareness information. Alternatively, in another embodiment, identity framework 220 may, if the specific communication mechanisms allow, initiate communication with all members of such a group— via communication mechanisms appropriate for each member. Identity framework 220 may be configured, in one embodiment, to allow a local user to configure how identity framework 220 communicates with individuals of a group. For instance, in some embodiments, identity framework 220 may be configured to allow a user to specify communication policies for how to communicate with identities and/or groups of identities. For example, one policy might specify different communication mechanisms for different types of data, while another policy might specify different communication mechanisms for different amounts or sizes of data. In one embodiment, a user may define a policy that specifies that data under a certain size should be delivered as an instant message, while larger amounts of data should be delivered via P2P-FTP. Alternatively, in another embodiment, a user may define a policy that specifies that textual information should be delivered via instant message, while other files, such as image or audio files, should be delivered via either P2P-FTP or as email attachments. Such polices may be defined for a single identity, a group of identities, or for various ad-hoc groupings of identities, according to various embodiments.

In one embodiment, an identity aware application or process may be configured to automatically communicate, such as via an instant message, without any user input. For instance, a monitoring process may detect a potential fault and may be configured to send an instant message to a technician at another site. In such an example, the monitoring process may format the instant message and communicate with identity framework 220 requesting that the instant message be sent to the technician. According to some embodiments, such a monitoring process would not need to be aware of the details of how to communicate with the remote technician, but would only need to be aware of the technician's identity, as maintained by identity framework 220. Additionally, in such an embodiment, only identity framework 220 and not the monitoring process would need to be aware of changes to the technician's presence, reach-ability, accessibility, or availability. In other embodiments, identity aware applications may be configured to automatically request orchestrated group communication with all members of a group of identities, such as through identity framework 220, automatically without user input.

Figure 8B:
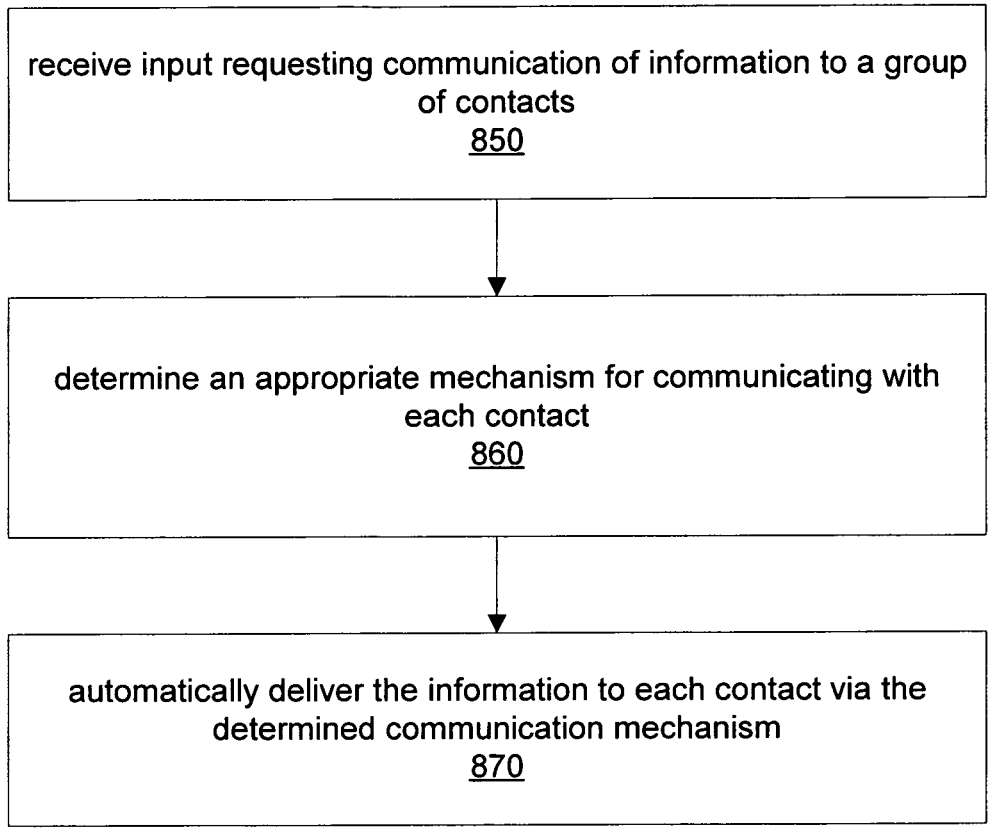
FIG. 8B is a flowchart illustrating a method for initiating communication with a group of identities via orchestrated group communication through an identity framework, according to one embodiment.

While FIG. 8A was flowchart illustrating one embodiment of a method for communicating with a single remote user, FIG. 8B is a flowchart illustrating one embodiment of a method for communicating with a group of contacts via orchestrated group communication. As described above, a user interface, such as identity aware user interface 210, or a communication framework, such as identity framework 220, may receive input requesting communication with a group of contacts, as illustrated by block 850. For example, in one embodiment, a user may drag and drop a document onto an icon representing a group of contacts.

In some embodiments, a communication framework, or user interface, may require a user to predefine contact groups before communicating with them. In other embodiments, however, a user may be able to use orchestrated group communication with an ad-hoc contact group. For example, in one embodiment, a communication framework or user interface may be configured to allow a user to select multiple, individual contacts, such as by selecting a group of single contact icons with a mouse, and request group communication for the ad hoc contact group defined by the multiple selection. The communication framework may determine appropriate communication mechanisms for communicating with each member of the ad-hoc group in the same manner as it would for a pre-defined contact group. In yet other embodiments, a communication framework may provide, or present, a user interface allowing a user to select various contacts by name (e.g. JohnM, MaryH, Customer Service, etc) that also provides an interface for specifying the information (e.g. text message, image files, etc) to be communicated to each member of the group.

In some embodiments, a contact group may include another contact group as a member. Thus, in some embodiments, a communication framework may be configured to expand nested contact groups and communicate with each member of the main contact group as well as each member of contact groups included in the main contact group.

In response to receiving the input requesting group communication, the user interface or communication framework, such as identity framework 220, may determine an appropriate mechanism for communicating with each contact of the group, as illustrated by block 860. In some embodiments, a communication framework may determine the availability of a contact via its own internally maintained availability and contact information. For example, the communication framework may be configured to allow a user to define the various methods via which a contact may be reached (e.g. email address, IM nickname or ID, Peer2Peer address, text messaging phone number, etc.) In other embodiments, however, a communication framework may access and/or collect presence/availability/reachability information from other sources, such as a shared, network accessible, contact directory or other communication applications. For example, in one embodiment, a group communication framework may be configured to access email addresses for contacts from an email application. Similarly, a group communication framework may be configured to access the instant messaging identifiers for contacts from an instant messaging application.

In some embodiments, a communication framework may be configured to communicate with other such frameworks across networks in order to help determine possible communication mechanisms for delivering information to various contacts. In one embodiment, multiple communication frameworks may be configured to share availability and reachability information with other, as discussed above. For instance, a communication framework may send query messages to other frameworks to determine if the other frameworks have any availability or reachability information for a particular contact or contacts. Alternatively, multiple communication frameworks may collectively maintain a shared directory of availability and reachability information for a set of contacts. For example, an organization may install a communication framework on each person's workstation and configure each framework to maintain contact information (including availability and reachability information) in a single, shared directory (or database) on a shared network server. Thus, a user may be able to communicate with contacts for which the user has no direct knowledge regarding communication mechanisms via which those contacts are available.

When determining an appropriate communication mechanism via which to communicate with a particular contact, a communication framework may be configured to analyze availability information for that contact to determine whether that contact is likely to be reachable via each communication mechanism at that particular time. For example, if a communication framework has both a work and home email address for a contact, the framework may select from between them based on the current time of day. Additionally, an orchestrated group communication framework may be configured to select a communication mechanism that generally has faster delivery times than one that generally provides a slower delivery (e.g. selecting instant messaging over email messaging).

In some embodiments, a communication framework may be configured to first determine whether or not a contact is current available via any communication mechanism, as discussed above. In one embodiment, a group communication framework may be configured to access calendar and/or appointment information for a recipient, such as via a shared appointment calendar, to determine whether the recipient is current available via specific communication channel. For example, a communication framework may be configured to access calendar information for a recipient and may determine that the recipient is out of the office all day, and in response the framework may not attempt to communicate with the recipient via instant messaging, according to one embodiment. If, in another embodiment, the framework determines that a contact is not currently available, the framework may present various options to the sender. For example, the sender may elect to have the framework keep attempting to communicate the information to the contact, perhaps once every hour until the contact is available. In another embodiment, the framework may be configured to allow the user to specify a different communication mechanism or channel to use.

After determining an appropriate communication mechanism via which to communicate with each member of the contact group, the identity aware user interface or communication framework may, in some embodiments, automatically deliver the information to each member of the contact group via the determined communication mechanism, as illustrated by block 870. As noted above, the same information may be communicated to different members of the group via different mechanisms. When delivering the information identity framework 220 may utilize other communication applications, as described above, according to some embodiments. In other embodiments, however, identity framework 220 may be configured to perform some or all aspects of the communication itself, without relying upon additional communication applications.

Figure 9:
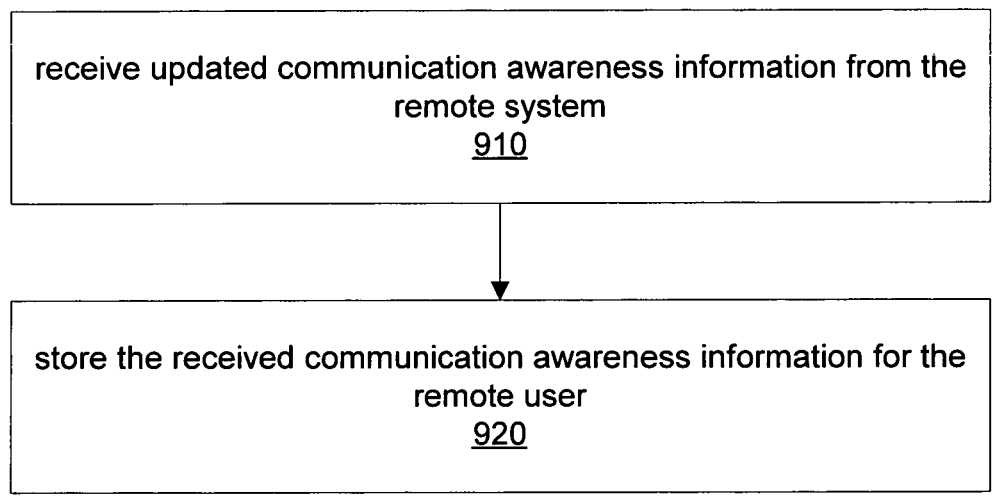
FIG. 9 is a flowchart illustrating, according to one embodiment, a method for updating stored communication awareness information.

FIG. 9 is a flowchart illustrating, according to one embodiment, a method for updating stored communication awareness information. As described herein, identity framework 220 may store and maintain communication awareness information for a number of identities, or groups of identities, such as by using a shared identity object corresponding to each identity or group of identities, according to some embodiments. In various embodiments, communication awareness information may include information regarding or related to the presence, availability, accessibility, or reach-ability of identities. In such an embodiment, identity framework 220 may receive updated communication awareness information from a remote system, as illustrated by block 910. For example, such updated communication awareness information may be received in response to a request sent by identity framework 220 or, in some embodiments, may be sent periodically by a remote system. In one embodiment, an identity framework executing on a remote system may periodically send out updated communication awareness information for one or more local identities. In response to receiving updated communication awareness information, identity framework 220 may store the received communication awareness information for the remote user, as illustrated by block 920. In one embodiment, identity framework 220 may store the updated communication awareness information in a shared identity object corresponding to the remote user for which the updated communication awareness information applies.

Figure 10:
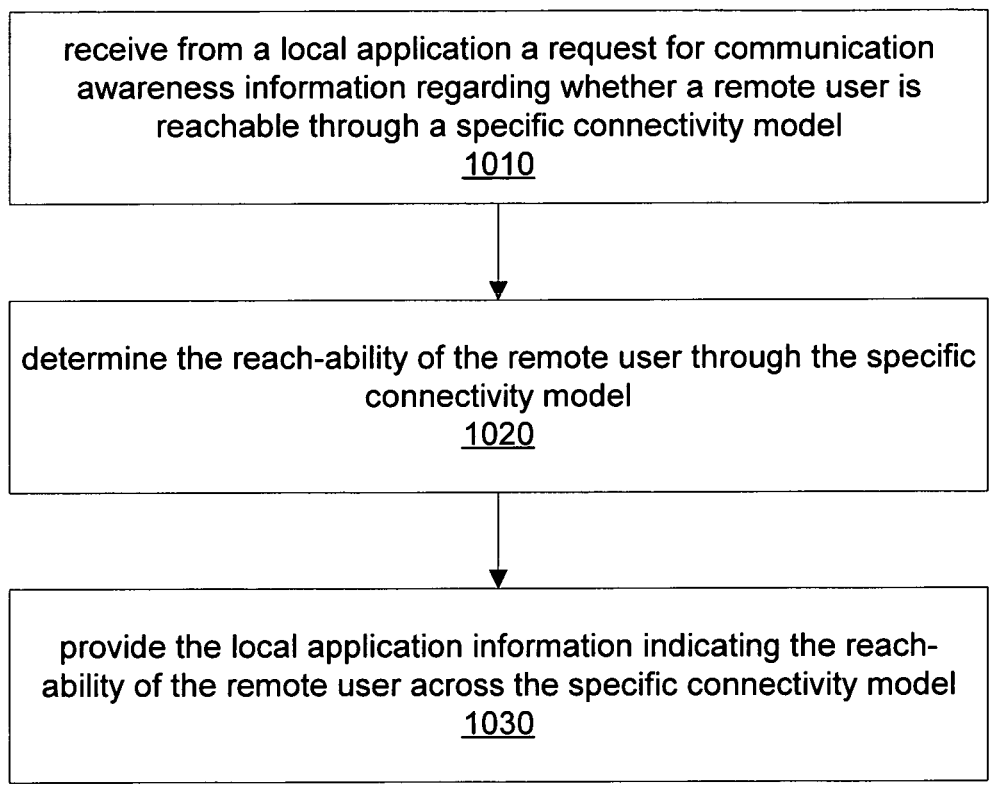
FIG. 10 is a flowchart illustrating, according to one embodiment, a method for indicating to an application whether a remote user is reachable through a specific connectivity model.

FIG. 10 is a flowchart illustrating, according to one embodiment, a method for indicating to an application whether a remote user is reachable through a specific connectivity model. According to one embodiment, an identity framework, such as identity framework 220, may maintain stored communication awareness information for one or more remote identities including information regarding specific communication models or mechanisms. Local identity aware applications may, in some embodiments, request information from identity framework 220 regarding whether or not a specific identity is available through a specific model or mechanism. For instance, identity based user interface 210 may request information regarding whether or not a remote user in reachable through a particular e-mail address, instant messenger screen name, or telephone number. In other embodiments, other communication models and connectivity mechanisms may be used. Thus, in one embodiment, identity framework 220 may receive from a local application a request for communication awareness information regarding whether a remote user is reachable through a specific connectivity model, as illustrated by block 1010. When performing orchestrated group communication, an identity aware application or user interface may request communication awareness information for each member of a group of contacts or identities.

In response to receiving such a request, identity framework 220 may, in certain embodiments, determine the reach-ability of the remote user through the specific connectivity model, as illustrated by block 1020. For instance, in one embodiment, identity framework 220 may retrieve the requested information from a locally stored identity object corresponding to the remote user. In another embodiment, identity framework 220 may request communication awareness information for the remote user from a remote system, as described herein. After determining the reach-ability of the remote user through the specific connectivity model, identity framework may provide the local application information indicating the reach-ability of the remote user across the specific connectivity model, as illustrated by block 1030. The specific manner or method used by identity framework 220 when providing the requested communication awareness information to a local application may vary from embodiment to embodiment. In one embodiment, the local application may have made the request using an API exposed by identity framework 220 and identity framework may supply the communication awareness information as a return parameter through the API.

Figure 11:
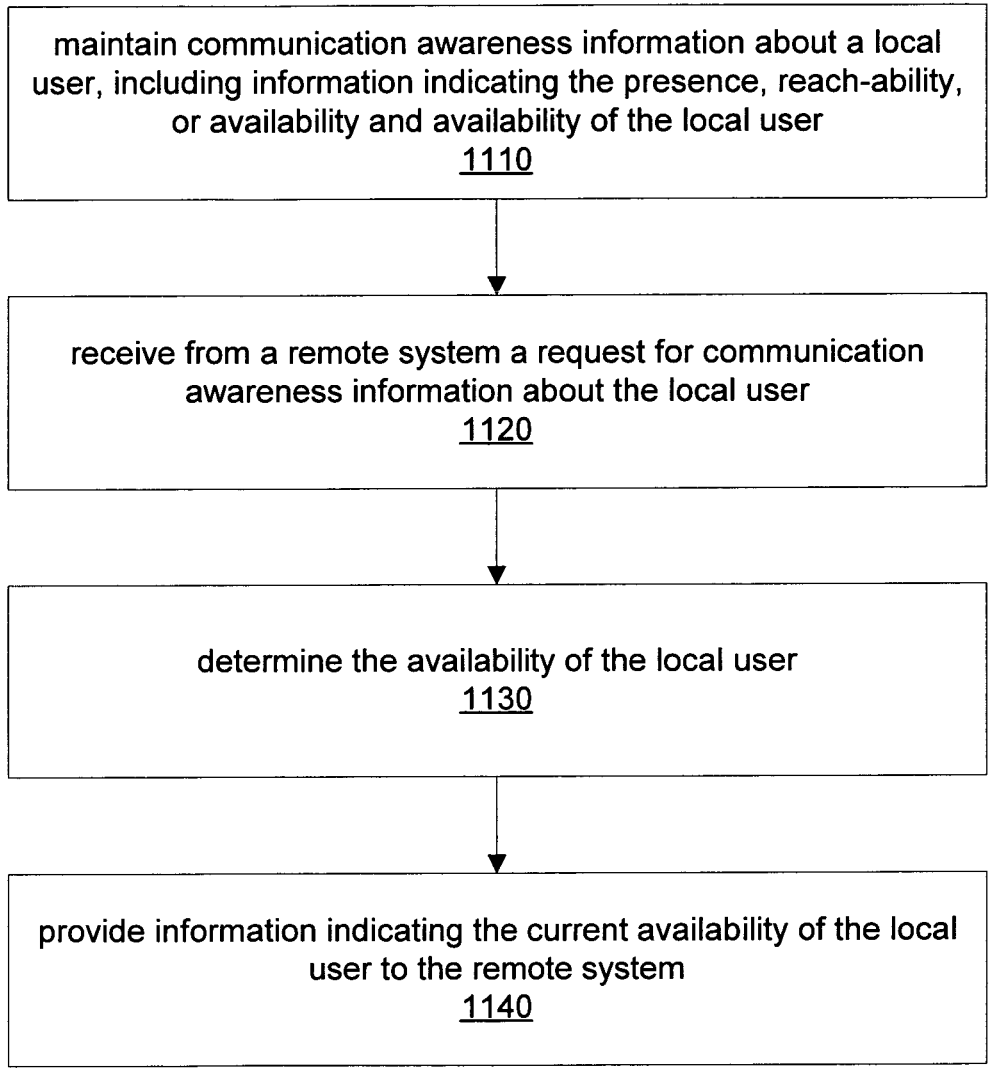
FIG. 11 is a flowchart illustrating, according to one embodiment, a method for supplying availability information about a local user to a remote system.

FIG. 11 is a flowchart illustrating, according to one embodiment, a method for supplying communication awareness information about a local user to a remote system. In some embodiments, an identity framework, such as identity framework 220 may maintain communication awareness information about one or more local users and may supply that information to remote systems, when requested. Thus, according to one embodiment, identity framework 220 may maintain communication awareness information about a local user, including information indicating the presence, reach-ability, accessibility, or availability of the local user, as illustrated by block 1110.

In one embodiment, identity framework may store and maintain such communication awareness information using identity objects corresponding to each of the local users. In such an embodiment, identity framework 220 may receive from a remote system a request for communication awareness information about one of the local users, as illustrated by block 1120 and in turn may determine the availability of the local user, as illustrated by block 1130. In one embodiment, identity framework 220 may determine the current availability of the local user by loading the information from a shared identity object storing previously determined availability information. In another embodiment, identity framework may communicate and interact with other applications or services to determine the user's reach-ability or availability. For example, identity framework 220 may, in one embodiment, determine whether or not the user is currently logged onto the local system, or may request from a telephony application whether or not the user is currently on the phone.

In certain embodiments, identity framework 220 may be configured to allow a user to turn off the distribution of information regarding their presence, availability, accessibility, and reach-ability. For example, in one embodiment, a local user may desire to be unavailable or may otherwise want to not be disturbed and identity framework 220 may be configured to allow such a user to turn off the distribution of their availability information, according to one embodiment. In other embodiments, identity framework 220 may be configured to allow a user to restrict how presence, availability, accessibility, and/or reach-ability information is distributed. For example, a user may desire to restrict the specific communication methods or mechanisms through which other people may contact him. For instance, such a user may desire to make his phone number and his availability via telephone available to only a certain number of trusted contacts and provide only his e-mail address to everyone else. Additionally, such a user may desire to only provide availability and reach-ability information to contacts that also make their availability and reach-ability information available. Identity framework 220 may display a user interface allowing a user to select and configure such functionality, in one embodiment.

Alternatively, identity framework 200 may rely upon another program or process, such as identity based user interface 210 to detect and provide information indicating such selection or configuration information for a user. Thus, in various embodiments, identity framework 220 may be configured to allow users to control and/or restrict how and to whom their current presence, availability, accessibility, and reach-ability information is distributed. After determining the local user's current availability, identity framework 220 may provide information indicating the current availability of the local user to the remote system, as illustrated by block 1140. In one embodiment, identity framework 220 may be configured to provide availability information indicating that a local user has requested not to be available and therefore the provided availability information may include a "do not disturb" or "offline" indication. In another embodiment, identity framework 220 may provide different presence, availability, and reach-ability information for the same local user to different requesters when the local user has so configured identity framework 220. The specific nature and manner of communication between the remote system and identity framework 220 may vary according to different embodiments, and in general any form of network communication may be used.

Figure 12:
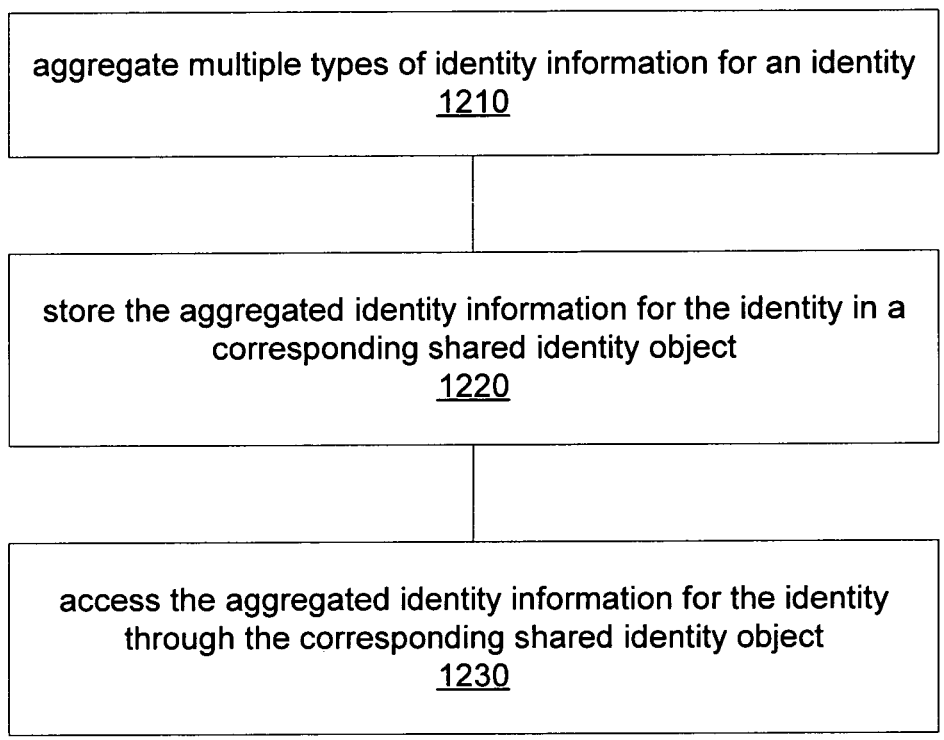
FIG. 12 is a flowchart illustrating, according to one embodiment a method for storing and accessing aggregated identity information in an identity object.

FIG. 12 is a flowchart illustrating, according to one embodiment, a method for storing and accessing aggregated identity information in an identity object. According to certain embodiments, an application or process, such as identity framework 220 may be configured to store identity information in one or more identity objects, such as identity objects 230. In such an embodiment, identity framework 220 may aggregate multiple types of identity information for an identity, as illustrated by block 1210 and may store the aggregated identity information for the identity in a corresponding shared identity object, as illustrated by block 1220. For example, identity framework 220, or another application or process, may gather different types of identity information from various places, such as communication applications, directory servers, etc. and store aggregates the information for each identity and store the aggregated information in a shared identity object corresponding to each identity. The types of identity information that may be stored in identity objects may vary according to different embodiments, but may include, among other things, presence, availability, availability, or other communication-related information.

Once aggregated identity information has been stored in shared identity objects, various applications and processes may, according to one embodiment, access the aggregated identity information for the identity through the corresponding shared identity object, as illustrated by block 1230. In one embodiment, shared identity objects may be configured such that applications or processes residing on a remote device(s) may access or modify the stored identity information. Thus, a shared identity object, according to certain embodiments may supply identity information to any number of local or remote applications. According to various embodiments, applications, such as identity framework 220 or identity based user interface 210, may add additional identity information to a shared identity object for an identity when new identity information is detected, or when identity information changes.

Figure 13:
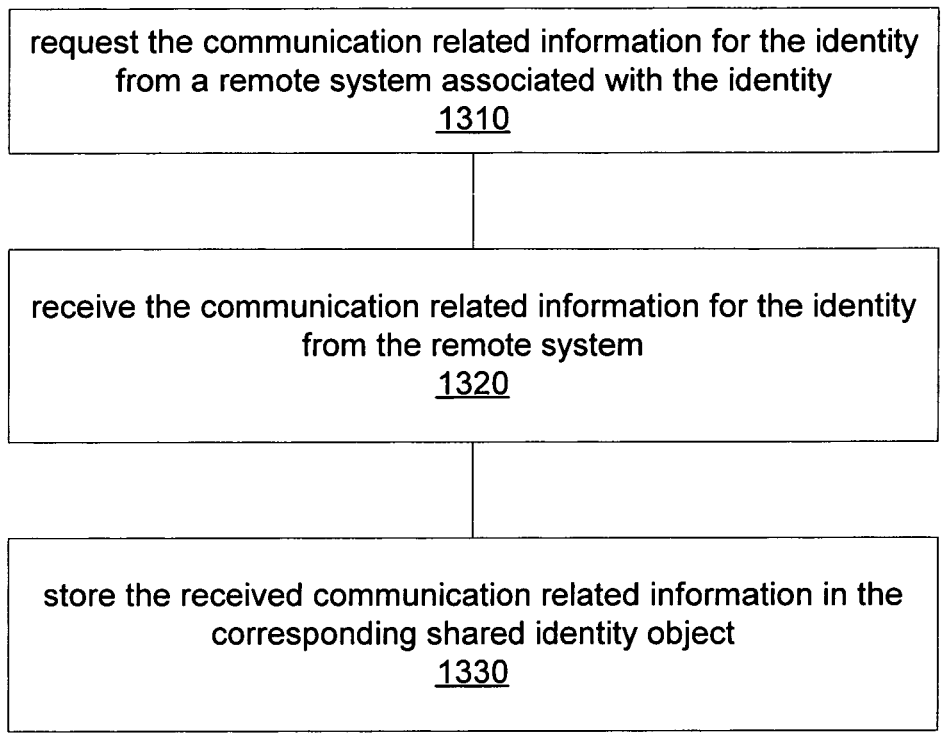
FIG. 13 is a flowchart illustrating, according to one embodiment, a method for storing identity information received from a remote system in an identity object.

FIG. 13 is a flowchart illustrating, according to one embodiment, a method for storing identity information received from a remote system in an identity object. According to certain embodiments, an application or process, such as identity framework 220 may be configured to communicate and interact with applications or processes residing on remote devices in order aggregate and store identity information in shared identity objects, such as identity objects 230. In such an embodiment, identity framework 220 may request communication related information for an identity from a remote system associated with the identity, as illustrated by block 1310 and may also receive the communication related information for the identity from the remote system, as illustrated by block 1320, before storing the received communication related information in a corresponding shared identity object, as illustrated by block 1330. For example, identity framework 220 may be configured to communicate with an online company directory to collect identity information for an identity, in one embodiment. Identity or communication related information received from a remote system may be integrated and aggregated with information gathered from local applications or other sources, according to various embodiments.

Figure 14:
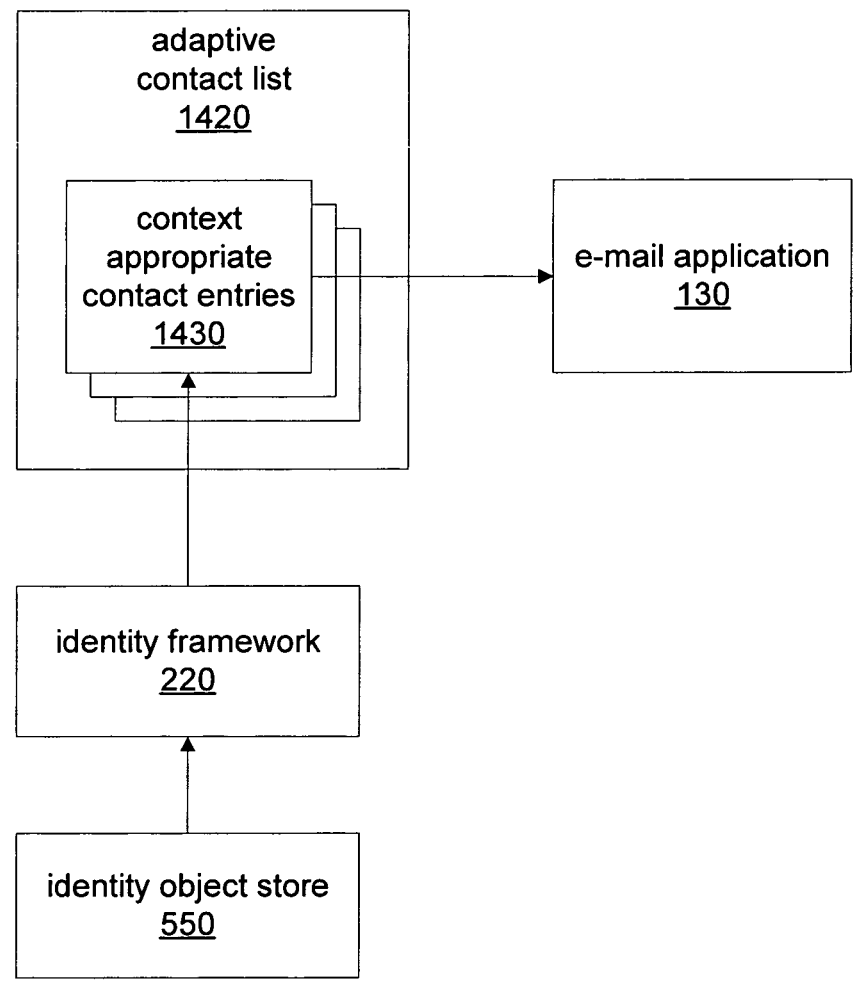
FIG. 14 is a block diagram illustrating an adaptive contact list supplying context appropriate contact information, according to one embodiment.

FIG. 14 is a block diagram illustrating, according to one embodiment, an adaptive contact list. An adaptive contact list, such as adaptive contact list 1420, according to one embodiment, may determine and supply context appropriate contact entries to other applications, such as e-mail application 130 or identity based user interface 210. In some embodiments, adaptive contact list 1420, may supply aggregated identity information for a number of local and remote identities to multiple applications and processes. A contact list may be adaptive, according to some embodiments, because the exact identities supplied and the specific identity information for each supplied identity may vary according to the particular context in which they are supplied.

Thus, in some embodiments, an adaptive contact list, such as adaptive contact list 1420, may detect a current context for a user, and determine a context appropriate set of contact entries. Adaptive contact list 1420, may, in certain embodiments, provide different contact entries according to different contexts. For instance, in one embodiment, adaptive contact list 1420 may supply one set of contact entries when a user has an e-mail application, such as e-mail application 130, active, and may provide a different set of contact entries when the user has an instant messenger application active. In another embodiment, when supplying identity information in a context in which an e-mail application is active, adaptive contact list 1420 may provide only contacts that have at least one e-mail address. Similarly, when detecting that the current context includes an instant messenger application, adaptive contact list 1420 may supply contacts that include at least one instant messenger screen name.

Adaptive contact list 1420 may take various forms according to various embodiments. In one embodiment, adaptive contact list 1420 may include a user interface that allows a user to select or interact with one or more contact entries from those supplied by adaptive contact list 1420. In another embodiment, adaptive contact list 1420 may programmatically provide the context appropriate contact information to contact aware applications, such as e-mail application 130. In yet another embodiment, adaptive contact list 1420 may expose one or more API functions allowing other applications to obtain contact entries, any may allow such applications to provide different context parameters when requesting or obtaining contact entries.

In one embodiment, adaptive contact list 1420 may be a stand-alone application that stores and maintains the various contact entries and information. In another embodiment, adaptive contact list 1420 may rely upon an identity framework, such as identity framework 220, to maintain the actual contact information. For example, identity framework 220 may store contact information for one or more identities in corresponding identity objects, perhaps in identity object store 550, described herein. In yet other embodiments, adaptive contact list 1420 may interact directly with stored identity objects, such as might be included in identity object store 550. In such an embodiment, adaptive contact list 1420 may not utilize an identity framework.

Adaptive contact list 1420 may detect different contexts and associate different sets of contacts with different contexts, according to various embodiments. For example in one embodiment, adaptive contact list 1420 may, when detecting a current context, determine one or more currently active applications, the time of day, login information, or machine name, among other things. In certain embodiments, adaptive contact list 1420 may monitor the context information in the background and may, in response to detecting changes in the current context information, update which contacts are included in context appropriate contact entries 1430.

In one embodiment, adaptive contact list 1420 may receive a request for contact information from another application, such as e-mail application 130, or may receive such a request from a user interface presented by adaptive contact list 1420. For example, adaptive contact list 1420 may display a user interface allowing a user to select contact entries for use with other applications, or may provide a more comprehensive user interface allowing a user to not only select a contact, but to also initiate communication with that contact. In one embodiment, adaptive contact manger 720 may utilize identity framework 220 to perform various communication processes regarding the context appropriate contact entries 1430.

Adaptive contact list 1420 may, in some embodiments, allow a user to add, remove, and modify the information in the contact entries, and also may allow a user to specify whether a particular contact should be provided under certain contexts. For example, adaptive contact list 1420 may allow a user to specify that a particular contact, perhaps a personal contact, should not be provided in a business related context, such as during business hours, or when the user is using a specific business related application.

In some embodiments, identity based user interface 210 may utilized an adaptive contact list to provide orchestrated group communication for the adaptive contact list. Thus, a user may be able to request communication of information to a current adaptive contact list via a single user action to identity based user interface 220. Identity based user interface 200 may then communicate the information to each member of the current adaptive contact list via orchestrated group communication, as described herein. As note above, identity based user interface 200 may rely upon a communication framework, such as identity framework 220 when implementing orchestrated group communications, whether based on predefined a contact group or an adaptive contact list.

Figure 15:
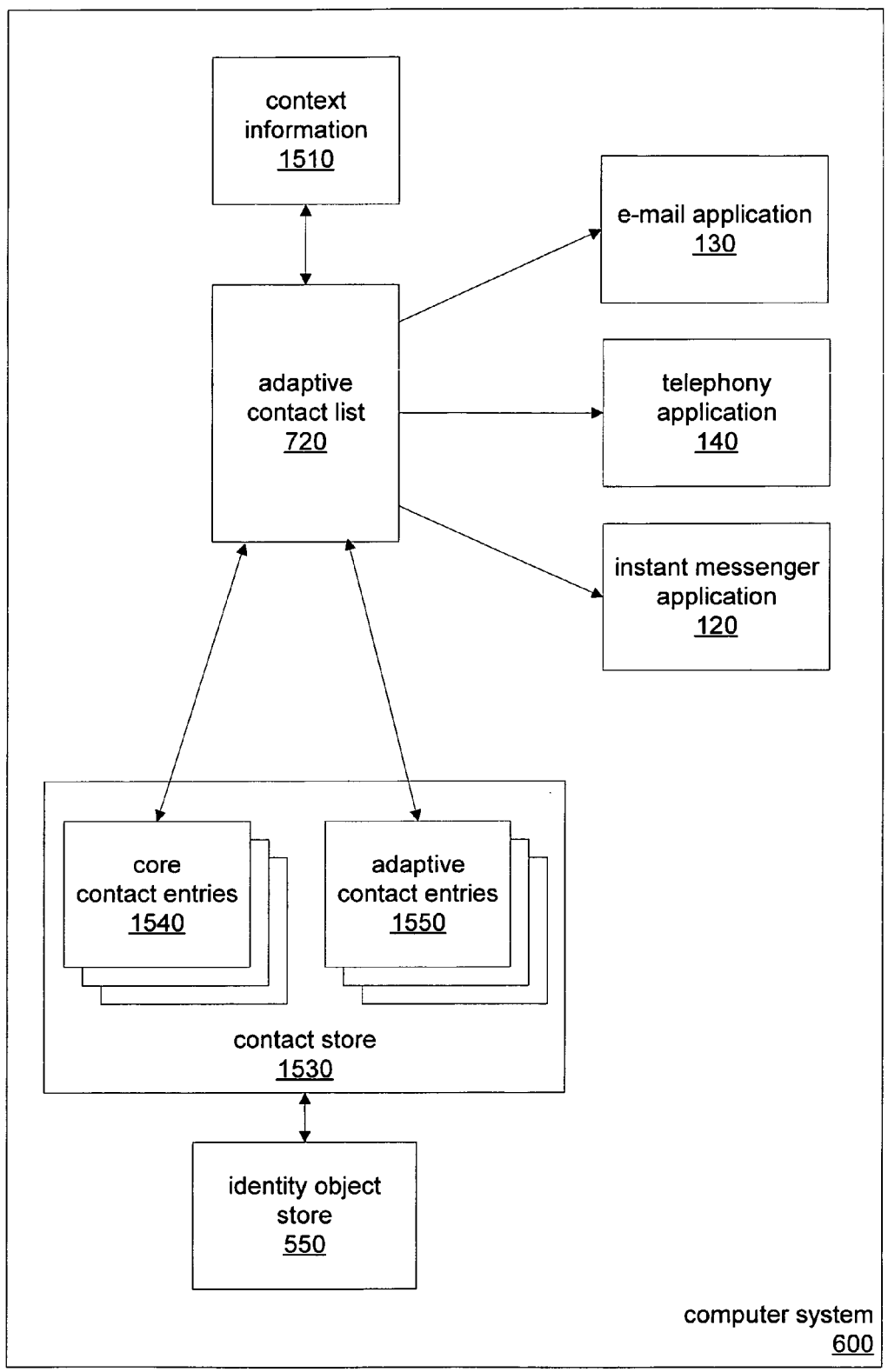
FIG. 15 is a block diagram that illustrates, according to one embodiment, both core and adaptive contact entries.

FIG. 15 is a block diagram that illustrates, according to one embodiment, both core and adaptive contact entries. In certain embodiments, an adaptive contact list, such as adaptive contact list 1420, may maintain a core set of contacts, such as core contact entries 1540, and may supply them regardless of the current context and in addition to any adaptive, or context appropriate, contact entries. For example, according to one embodiment, adaptive contact list 1420 may provide different contacts depending upon the currently active application, but may also provide the same set of core contacts no matter what application is currently active. In another embodiment, adaptive contact list 1420 may allow a user to specify which contacts are members of the core contacts. For example, a user may desire to have all the contacts for people in her own work group available in any context. In yet other embodiments, adaptive contact list 1420 may supply as core contacts one or more recently accessed contacts. When implementing orchestrated group communication, identity based user interface 200 may include both core contacts and adaptive contacts in an ad-hoc contact group and allow a user to request communication to both the core and adaptive contacts via a single action, as noted above. A user may be able to specify or configure whether core contacts are to be included in orchestrated group communication to an adaptive contact list, according to certain embodiments.

In some embodiments, adaptive contact list 1420 may maintain more than one set of core contacts or contact entries. For instance, adaptive contact list 1420 may allow a user to specify one set of core contacts for use with all business related contexts, but may also allow the user to setup a different set of core contacts for use with personal contexts. In some embodiments, contacts may be included in more than one core set of contact entries. According to another embodiment, adaptive contact list 1420 may be configured to not supply certain contacts in core contact entries 1540 that are not appropriate for the current context. For example, if e-mail application 130 is currently active, adaptive contact list 1420 may not present those contacts in core contact entries 1540 that do not include at least one e-mail address. Similarly, in another embodiment, adaptive contact list 1420 may only present core contacts that include at least one instant messenger screen name in contexts that include an active instant messenger application.

As illustrated in FIG. 15, adaptive contact list 1420 may, in some embodiments, determine context information 1510 and may use that information to determine which contacts in contact store 830 should be included in adaptive contact entries 1550. Context information 1510 may include various types of information such as current login information, currently active applications, and the date and time of day, among other things. In certain embodiments, adaptive contact list 1420 may be configurable to allow a user to specify what particular types of contextual information should be considered when determining the current context. For example, one user may desire to have adaptive contact list 1420 use date and time based contexts, while another user may desire not to use date and time based contexts, according to different embodiments. In certain embodiments, adaptive contact list 1420 may analyze context information 1510 to determine a single aggregated context for determining which contacts should be supplied.

Adaptive contact list 1420 may rely on information stored in one or more identity objects for each contact, such as in identity object store 550. Identity object store 550 may include more information in each identity object than may be required by adaptive contact list 1420. In certain embodiments, adaptive contact list 1420 may maintain separate contact lists, both core and adaptive, for different users of a system. For example, adaptive contact list 1420 may reside on a shared workstation, such as computer system 600, and may therefore be configured to maintain different contact lists for each possible user.

Figure 16A:
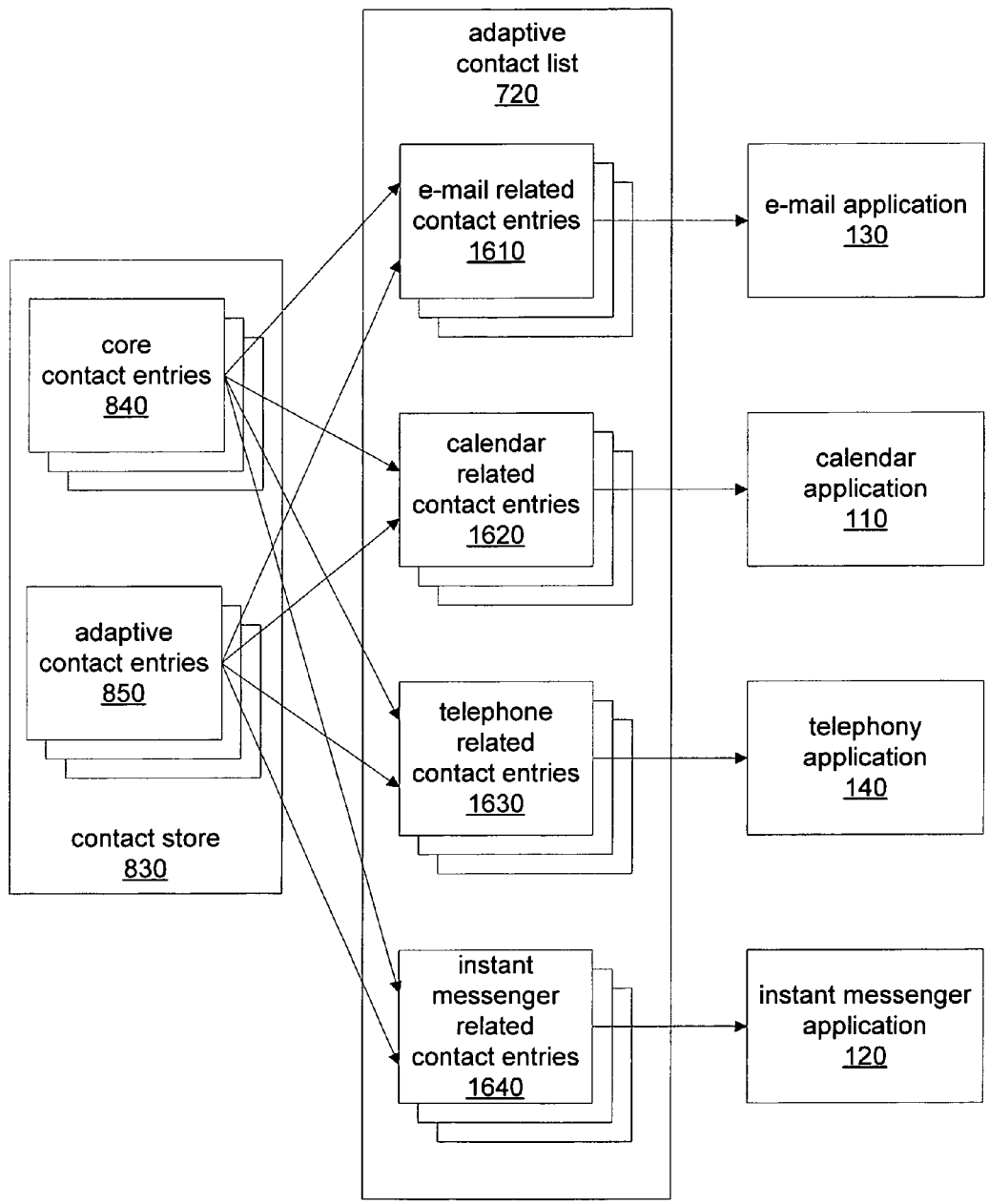
FIG. 16A is a block diagram illustrating, according to one embodiment, an adaptive contact list supplying both core and adaptive contact information to various communication applications.

FIG. 16A is a block diagram illustrating, according to one embodiment, an adaptive contact list supplying both core and adaptive contact information to various communication applications. According to one embodiment, adaptive contact list 1420 may provide different contacts depending upon what applications are indicated as active in the current context information. For example, when e-mail application 130 is active, adaptive contact list 1420 may provide e-mail related contact entries 1610 and may only include in e-mail related contact entries 1610 those contacts that include at least one e-mail address. When calendar application 110 is active, adaptive contact list 1420 may be configured to include in calendar related contact entries 1620 only those contact that include schedule related information, or those contacts which have been specified as calendar related manually by a user. Similarly, when telephony application 140 is active, adaptive contact manger 720 may include in telephone related contact entries 850 only those contacts that have at least one telephone number. Likewise, adaptive contact list 1420 may provide in instant messenger related contact entries 1640 only contacts having instant messenger screen names when instant messenger application 120 is active.

As illustrated in FIG. 9, adaptive contact list 1420 may also be configured to include core contact entries 1540 in e-mail related contact entries 1610, according to one embodiment. Similarly, adaptive contact list 1420 may, in one embodiment, be configured to include core contact entries 1540 in calendar related contact entries 1620, telephone related contact entries 1630, instant messenger related contact entries 1640, and in general whenever supplying contact information. In another embodiment, adaptive contact list 1420 may be configured to include only those contacts from core contact entries 1540 that are appropriate for the current context. For example, adaptive contact list 1420 may include only those contacts from core contact entries 1540 that include at least one e-mail address for contexts when e-mail application 130 is active.

According to certain embodiments, contact store 830 may differentiate between core contacts and adaptive contacts. In other words, contact store 830 may, in some embodiments, include two different sets of contact information. In other embodiments, contact store 830 may not differentiate between core and adaptive contacts, and in such embodiments, adaptive contact list 1420 may determine or keep track of which contacts should be supplied as core contacts and which should be considered as possible adaptive contacts.

Figure 16B:
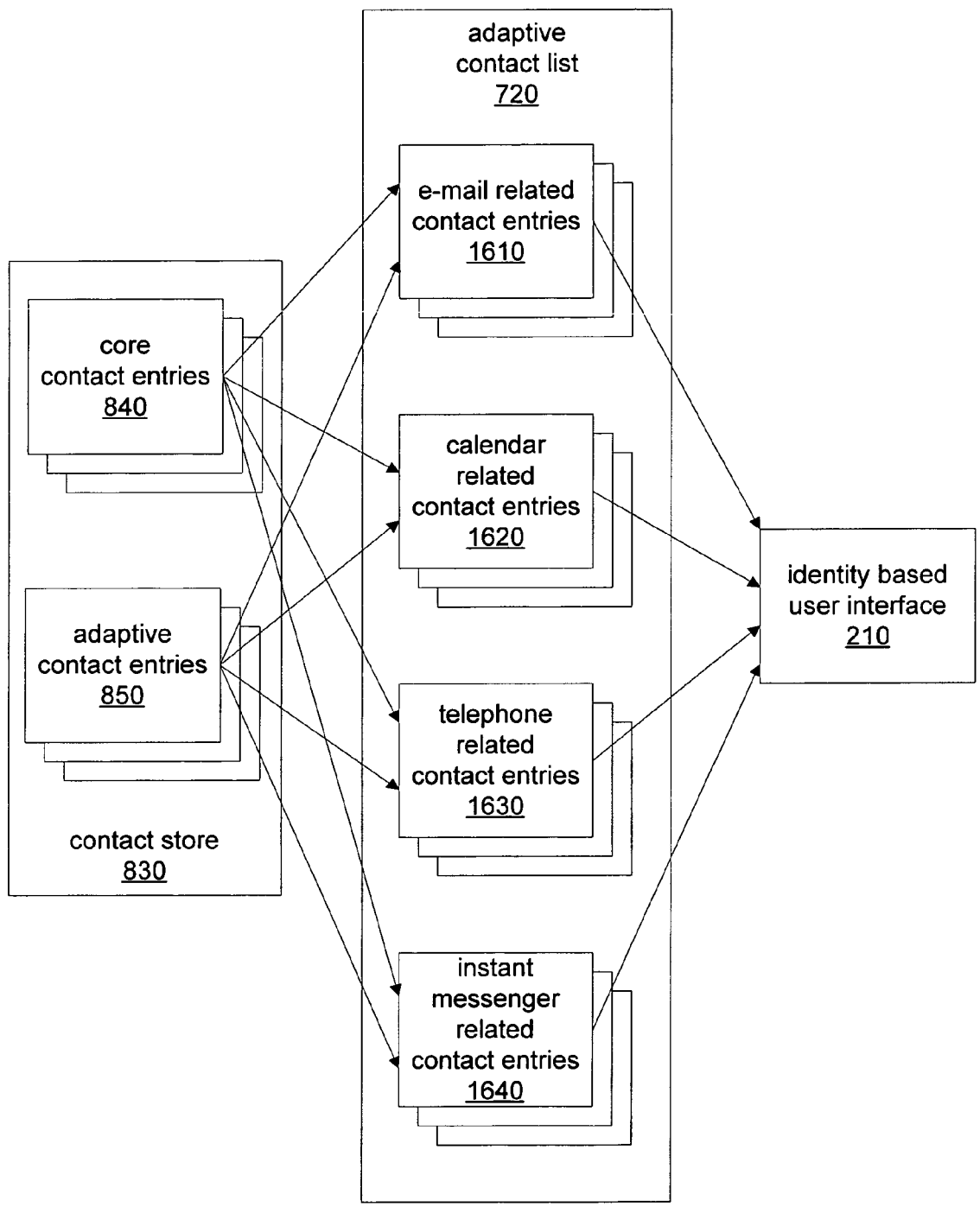
FIG. 16B is a block diagram illustrating, according to one embodiment, an adaptive contact list supplying mixed contacts to an identity aware user interface.

FIG. 16A, described above, illustrated an adaptive contact list supplying only a single type of contact to communication applications. FIG. 16B, however, is a block diagram illustrating an adaptive contact list supplying various types of contact (email, instant messenger, etc) to a single application, such as identity based user interface 210, according to some embodiments. In general, adaptive contact list 720 may interact with identity based user interface 210 in the same manner as described above regarding FIG. 16A. Thus, identity based user interface 210 may receive, based upon the user's current context, various core and adaptive contacts and may allow the user to communicate with one or more of those contacts, as described herein. However, in some embodiments, adaptive contact list 720 may provide a mixed set of contacts to identity based user interface 210. For example, adaptive contact list 720 may supply a list of contacts that includes email-related contacts, instant messenger related contacts, and other contacts, to identity based user interface 210. In response, identity based user interface 210 may, in some embodiments, treat the supplied contacts as an ad-hoc contact group and allow a user to request orchestrated group communication to the members of the ad-hoc contact group, as described above.

In some embodiments, identity based user interface 210 may only include certain of the contacts supplied by adaptive contact list 720 in an ad-hoc contact group for implementing orchestrated group communication. For instance, in one embodiment, the user may be communicating an electronic file or document and identity based user interface 210 may therefore exclude those contact which cannot receive the document, such as telephone related contacts 1630. Additionally, in some embodiments, a user may be able to configure a communication policy that specifies that only certain types of contacts, such as email related contacts and instant messenger related contacts, be included in orchestrated group communications, even if other contact types are supplied by adaptive contact list 720.

Figure 17:
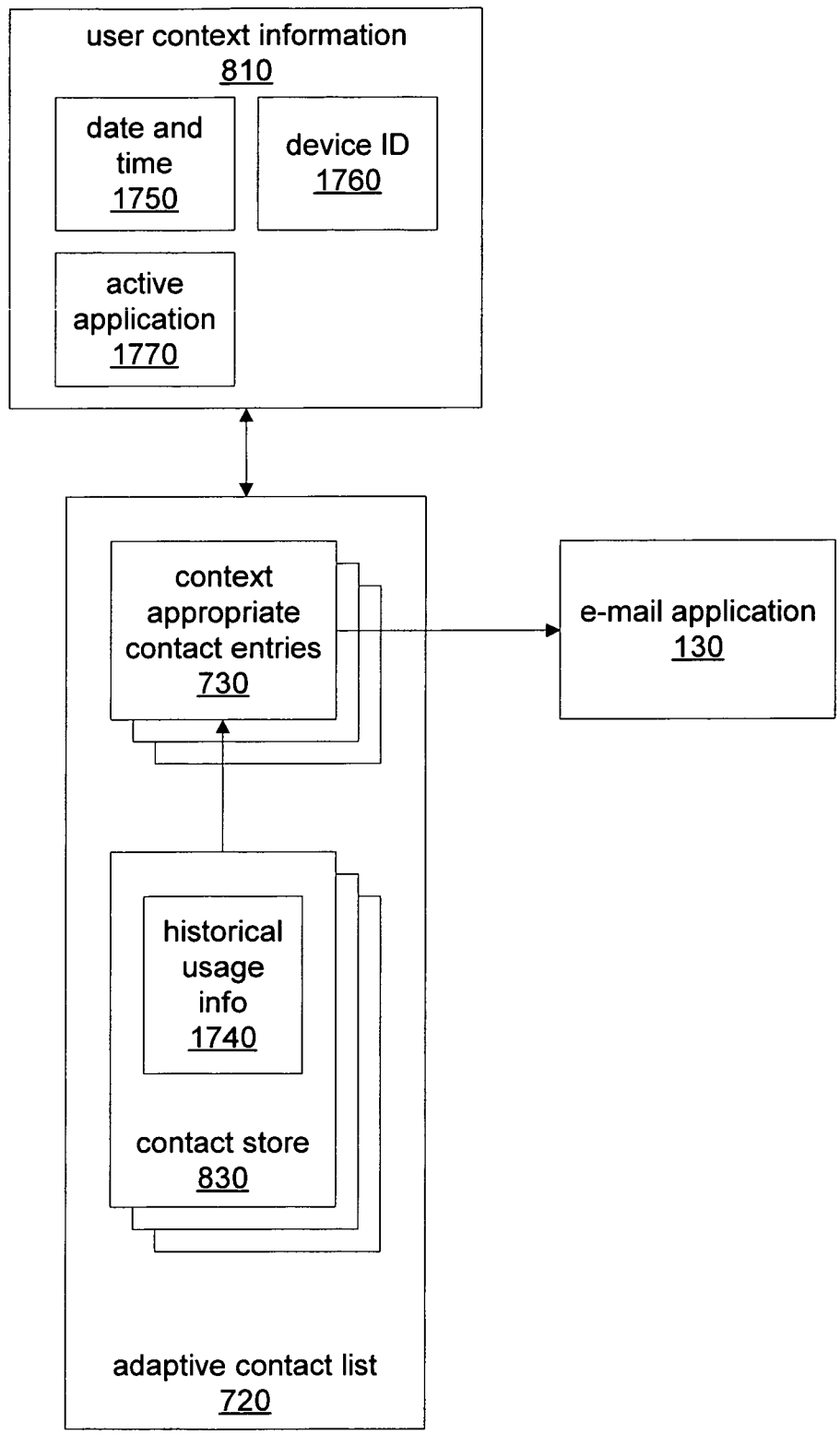
FIG. 17 is a block diagram illustrating an adaptive contact list using historical context information, according to one embodiment.

FIG. 17 is a block diagram illustrating an adaptive contact list using historical context information, according to certain embodiments. In certain embodiments, adaptive contact list 1420 may be configured to record and utilize historical context information when including contacts in context appropriate contact entries 1430. For example, adaptive contact list 1420 may include only those contacts historically used in similar contexts when e-mail application 130 was active. In some embodiments, adaptive contact manger may supply fewer, but more appropriate contacts, in certain contexts. For instance, in one embodiment, a user may use many contacts with e-mail addresses and may have to sort through all of them to determine which ones to include in a specific e-mail message. If adaptive contact list 1420 is configured to consider historical context usage when including or presenting contacts, adaptive contact list 1420 may be able to recommend those contacts that have historically been used under similar contexts or conditions. In such an embodiment, adaptive contact list 1420 may consider more information then just which application is active when determining the current and historical contexts. For instance, a certain user may send a project status report to the same people every Monday around 10 am. In such an embodiment, adaptive contact list 1420 may be configured to detect such a pattern and present those contacts under similar contexts. Such historical information may be stored with the stored contact information as illustrated by historical usage info 1740 in contact store 830, according to one embodiment. Alternatively, in other embodiments, historical usage information may be stored separately from, but may still be link to, the appropriate contacts in contact store 830.

In certain embodiments, adaptive contact list 1420 may indicate historically relevant contacts in various manners according to different embodiments and may supply or present such historically relevant contacts in a manner different than other context appropriate contact entries. For instance, in one embodiment, adaptive contact manger 720 may present all context-appropriate contacts in alphabetically order, but may highlight or otherwise denote those contacts that have been historically more relevant to the current context. In another embodiment, adaptive contact list 1420 may group those historically relevant contacts together and separate them from any other context appropriate contacts.

Additionally, adaptive contact list 720 may also utilize historically relevant information when supplying a mixed set of contacts to identity aware user interface 210 and identity aware user interface 210 may consider a set historically relevant contacts as an ad-hoc group for orchestrated group communication.

Figure 18:
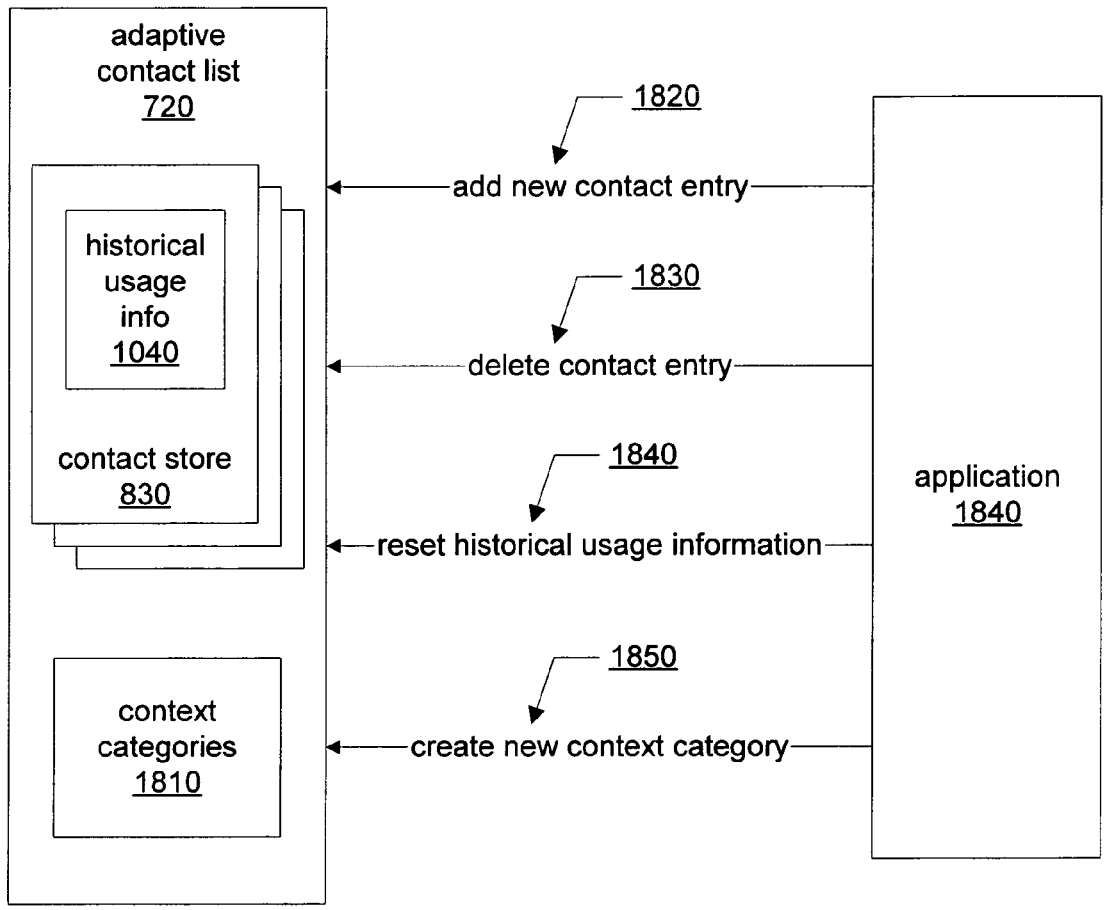
FIG. 18 is a block diagram illustrating, according to one embodiment, an adaptive contact list exposing an API for manipulating stored contact information.

FIG. 18 is a block diagram illustrating, according to one embodiment, an adaptive contact list exposing an API for manipulating stored contact information. In one embodiment, adaptive contact list 1420 may be configured to allow other applications to add, delete, or otherwise modify the maintained contacts or the historical usage information regarding the maintained contacts. For example, application 1840, which may in one embodiment be identity based user interface 210 described herein, may be able to add a new contact entry 1820, or to delete a contact entry 1830. Additionally application 1840 may, in some embodiments, be able to reset the historical usage information 1840 in order to cause adaptive contact list 1420 to record fresh historical usage information for contacts. In yet another embodiment, adaptive contact list may be configured to maintain different contextual categories, such as context categories 1810. These context categories may, in some embodiments, represent different aspects of a context that adaptive contact list 1420 should use to determine a current or historical context. For instance, in one embodiment, the active application may be used as one context category. In another embodiment, the date or time of day may be used as a context category. In certain embodiments, adaptive contact list 1420 may be configured to allow a user or application to select or specify the particular context categories that adaptive contact list 1420 may use when determining a context. Thus, application 1840 may be able to create a new context category 1850 or to select one or more existing context categories. In other words, according to certain embodiments, an application or a user, may be able to specify how adaptive contact list 1420 determines and compares current and historical contexts.

Figure 19:
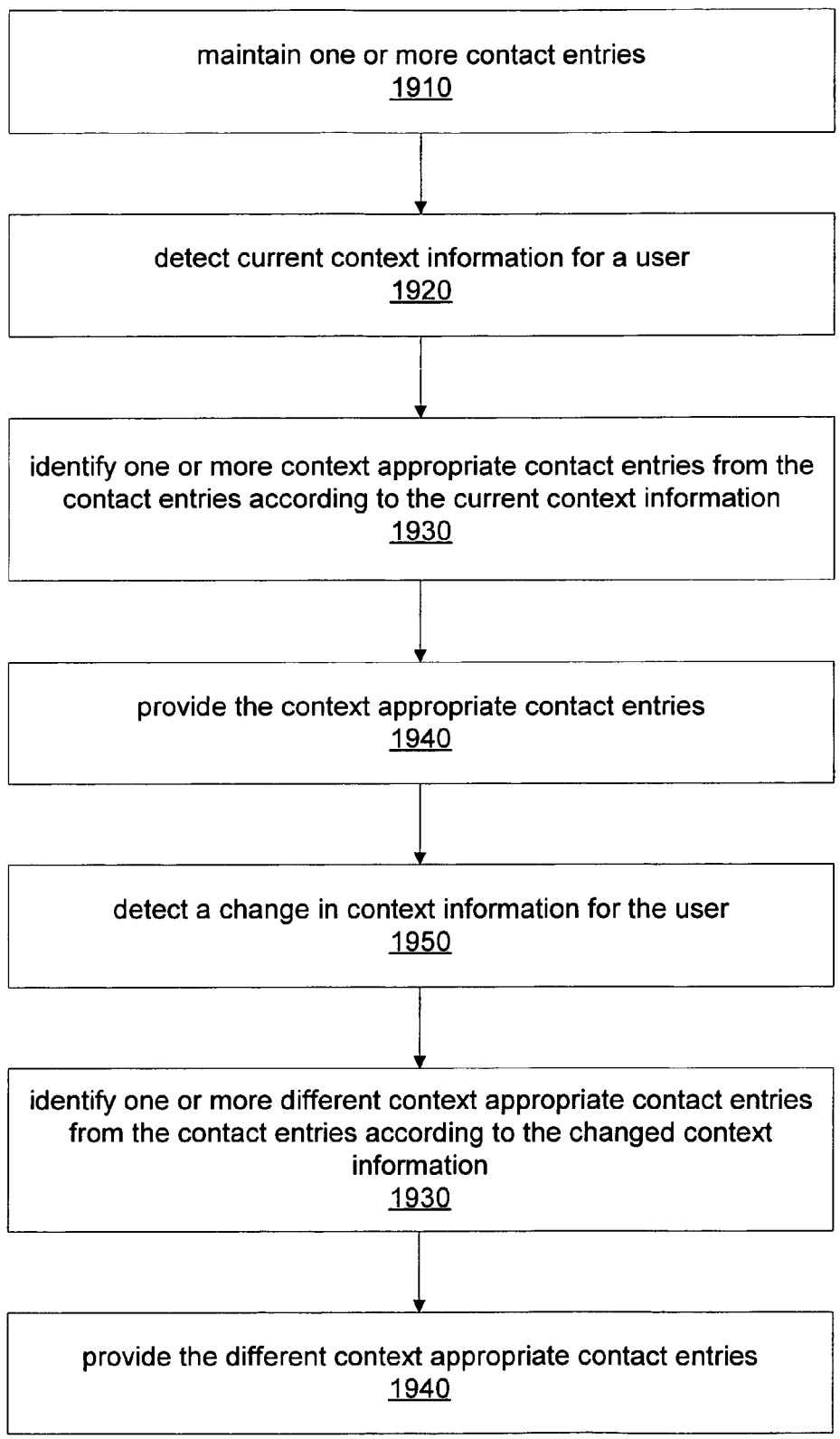
FIG. 19 is a flowchart illustrating, according to one embodiment, a method for an adaptive contact list.

FIG. 19 is a flowchart illustrating, according to one embodiment, a method for an adaptive contact list. Thus, according to some embodiments, an adaptive contact list, such as adaptive contact list 1420, may maintain one or more contact entries, as illustrated by block 1910, and may detect current context information for a user, as illustrated by block 1920. For example, adaptive contact list 1420 may, in one embodiment, maintain contact entries possibly including identity and communication information for a number of users or other identities. In one embodiment, adaptive contact list 1420 may store such contact and identity information in shared identity objects. In another embodiment, adaptive contact list 1420 may utilize an identity framework when storing and maintaining contact information and may rely upon such a framework for storage and retrieval functionality. In yet another embodiment, adaptive contact list may store contact and identity information itself.

When detecting current context information for a user, as illustrated by block 1920, an adaptive contact list, such as adaptive contact list 1420, may, in some embodiments, determine any of several contextual characteristics. For example, in one embodiment, adaptive contact list 1420 may be configured to determine one or more active, or executing, applications. In another embodiment, adaptive contact list 1420 may be configured to determine the current date, time, and or day of week. In yet another embodiment, adaptive contact list 1420 may be configured to determine the user's current login information. In other embodiments, adaptive contact list 1420 may be configured to allow a user to manually specify the particular context characteristic that adaptive contact list 1420 may detect and consider when determining a current context. In certain embodiments, adaptive contact list 1420 may be configured to save or store the current context information for future comparison with either contact entries or with future context information.

Adaptive contact list 1420 may, in certain embodiments, identify one or more context appropriate contact entries from the maintained contact entries according to the current context information, as illustrated by block 1930. For instance, in one embodiment, adaptive contact list 1420 may be configured to identify contact entries that are appropriate for one or more currently active or executing applications. For example, a user may be executing an e-mail application and adaptive contact list 1420 may detect the executing e-mail application as part of the current context and accordingly, adaptive contact list 1420 may identity one or more contacts entries that include at least one e-mail address and are therefore appropriate for a context that includes an executing e-mail application. In other embodiments, adaptive contact list 1420 may be configured to allow a user to specify, on a contact-by-contact basis, which contacts should be associated with particular contexts. For example, a user may specify that a particular contact should be associated with a context that includes a specific executing application. For instance, a user may desire to have his boss's contact associated with any context in which a project planning application is executing. Alternatively, a user may desire to have a set of contacts associated with contexts in which a meeting-planning tool is executing.

After identifying the context appropriate contact entries according to the current context information, adaptive contact list 1420 may provide the context appropriate entries, as illustrated by block 1940. For example, in one embodiment, adaptive contact list 1420, may display the contact entries for a user to select. In certain embodiments, adaptive contact list 1420 may be configured to display the identified contact entries, allow a user to select one or more of the contact entries, possibly allowing the user to select individual parts of the contact information of each contact entries, and then programmatically use the selected contact information to fill in a dialog box of an executing application.

An adaptive contact list, such as adaptive contact list 1420, may, in some embodiments, detect a change in context information for a user, as illustrated by block 1950. For example, adaptive contact list 1420 may be configured to periodically monitor the current context for a user and identity contact entries that are associated or are appropriate for the current context information. After detecting a change the context information for the user, adaptive contact list 1420 may be configured to identify one or more different context appropriate contact entries from the maintained contact entries according to the changed context information, as illustrated by block 1930. For instance, adaptive contact list 1420 may be configured to execute in the background periodically identifying appropriate contact entries as a user's current context changes. Adaptive contact list 1420 may compare current context information with saved or stored context information to determine whether a user's context has changed.

In one embodiment, adaptive contact list 1420 may be configured to display those contact entries that are identified as appropriate for a current context, and may update that display of contacts as the current context information changes. Adaptive contact list 1420 may, in one embodiment, provide the different context appropriate contact entries as illustrated by block 1940. As described herein, adaptive contact list 1420 may provide the contact entries and contact information in a number of ways. In one embodiment, adaptive contact list 1420 may be configured to display the contact information, or may alternatively fill in one or more user interface elements of an executing application.

Figure 20:
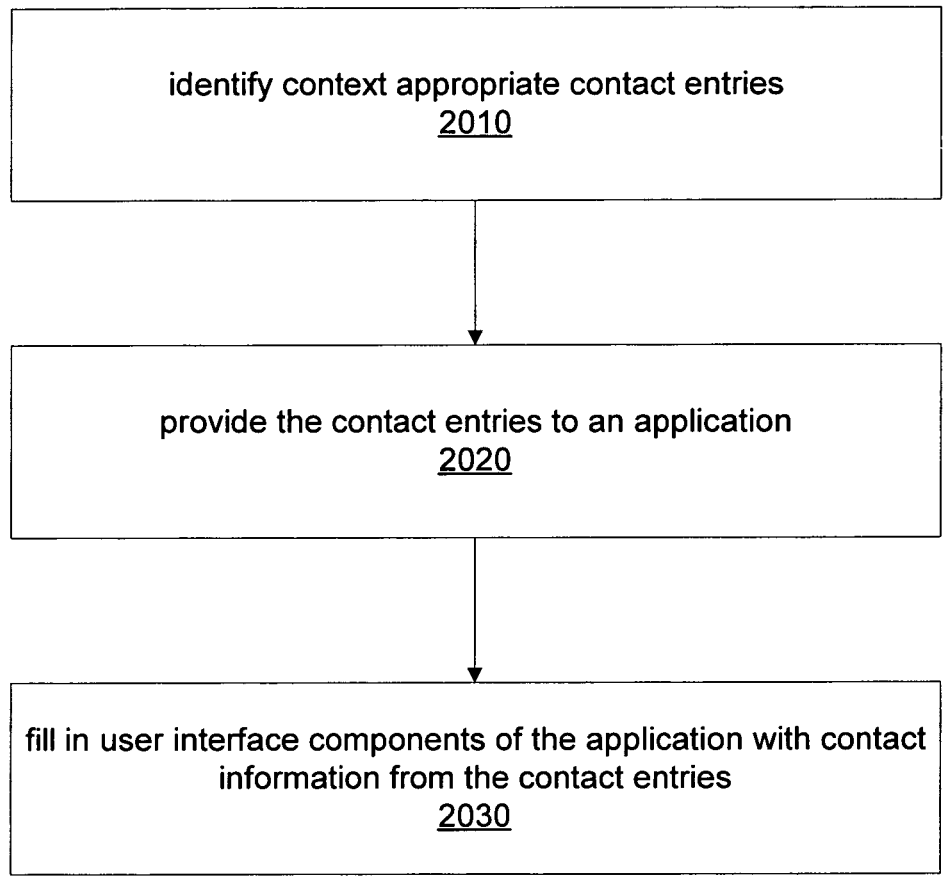
FIG. 20 is a flowchart illustrating, according to one embodiment, a method for using adaptive contact information to fill in user interface components of an application.

FIG. 20 is a flowchart illustrating, according to one embodiment, a method for using adaptive contact information to fill in user interface components of an application. In some embodiments, an adaptive contact list, such as adaptive contact list 1420, may be configurable to use context appropriate contact information to automatically fill in user interface elements of executing applications.

In one embodiment, an adaptive contact list, such as adaptive contact list 1420, may identify context appropriate contact entries, as illustrated by block 2010. As described herein, regarding FIG. 21, an adaptive contact list may detect a current context for a user and user that detected context information for identity one or more context appropriate contact entries according to the current context information. Additionally, adaptive contact list 1420 may, in one embodiment, provide the contact entries to an application, as illustrated by block 2020. For instance, adaptive contact list 1420 may be configured to send the identified context appropriate contact entries to an executing application any of several forms of inter-process communication. In another embodiment, adaptive contact list 1420 may comprise a shared or dynamic library allowing applications or other processes to request or retrieve the current set of identified context appropriate contact entries and their individual contact information.

Alternatively, in certain embodiments, adaptive contact lists, such as adaptive contact list 1420, may fill in user interface components of the application with contact information from the context appropriate contact entries, as illustrated by block 2030. In another embodiment, adaptive contact list 1420 may be configured to programmatically supply the contact information into user interface elements of a currently active application. For instance, adaptive contact list 1420 may automatically fill in one or more e-mail addresses into a dialog box displayed by an executing e-mail application. In some embodiments, adaptive contact list 1420 may be configured to allow a user to choose an executing application and may also allow the user to select a particular dialog box or window for which adaptive contact list 1420 may fill in user interface elements with contact information.

Figure 21:
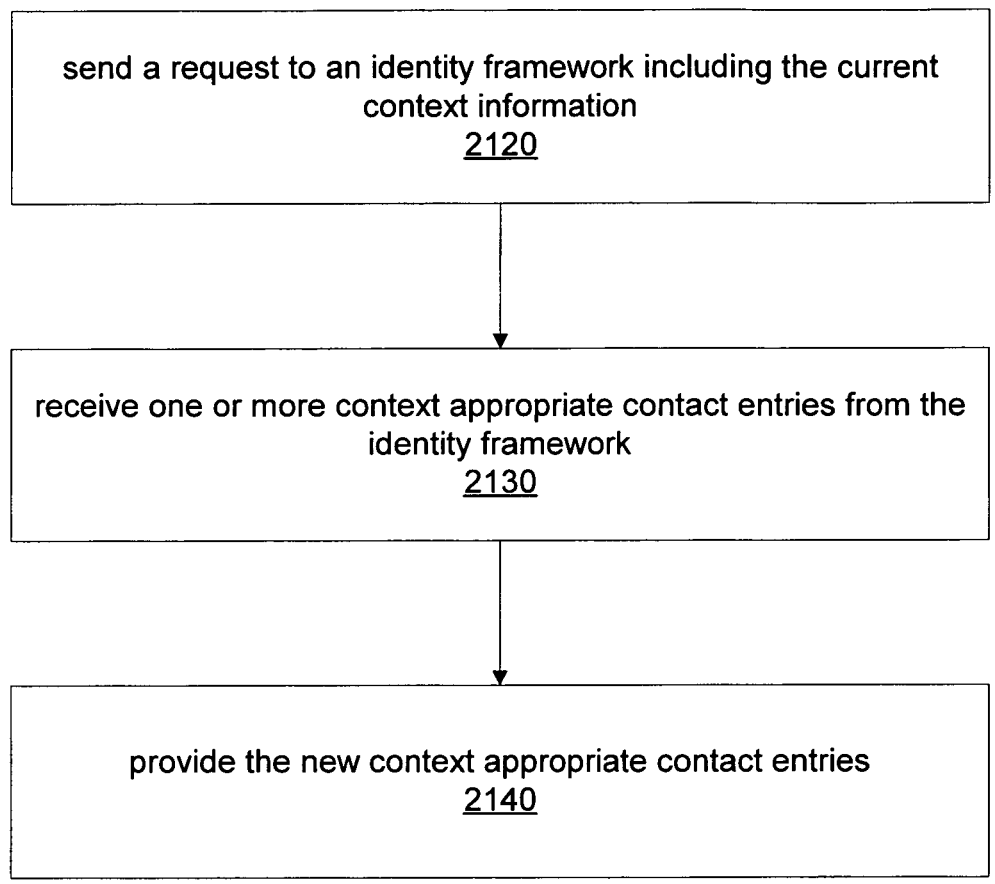
FIG. 21 is a flowchart illustrating, according to one embodiment, a method for implementing an adaptive contact list using an identity framework.

FIG. 21 is a flowchart illustrating, according to one embodiment, a method for implementing an adaptive contact list using an identity framework. In certain embodiments, an adaptive contact list, such as adaptive contact list 1420, may use an identity framework, such as identity framework 220, when identifying context appropriate contact entries or information. In such an embodiment, adaptive contact list 1420 may send a request to an identity framework including the current context information as illustrated by block 2120.

In certain embodiments, an identity framework, such as identity framework 220 may be configured to receive requests including current context information and may additionally be configured to identity context appropriate contact entries based on the context information included in the request. In another embodiment, identity framework 220 may be configured to store identity objects including identity and contact information for a number of identities or users, and adaptive contact list 1420 may send a request to identity framework 220 including current context information. After receiving such a request from adaptive contact list 1420, identity framework 220 may be configured to identity one or more identity objects that include contact information appropriate or associated with the context information included in the request, and Adaptive contact list 1420 may, in one embodiment, rely upon identity framework 720 to identity one or more identity objects containing contact information appropriate for the context information included in such a request and adaptive contact list 1420 may extract or load contact information from the identity objects and create contact entries from the identity objects and corresponding contact information. Alternatively, in another embodiment, adaptive contact list 1420 may receive identity objects from identity framework 220 and may convert those identity objects into contact entries include the appropriate contact information.

Additionally, in one embodiment, adaptive contact list 1420 may receive one or more context appropriate contact entries from the identity framework, as illustrated in block 2130 and may also be configured to provide new context appropriate contact entries, as illustrated by block 2140. Identity framework 220 may, in one embodiment, be configured to create or load the contact entries from identified identity objects and return them to adaptive contact list 1420 in response to receiving a request, as described herein.

Figure 22:
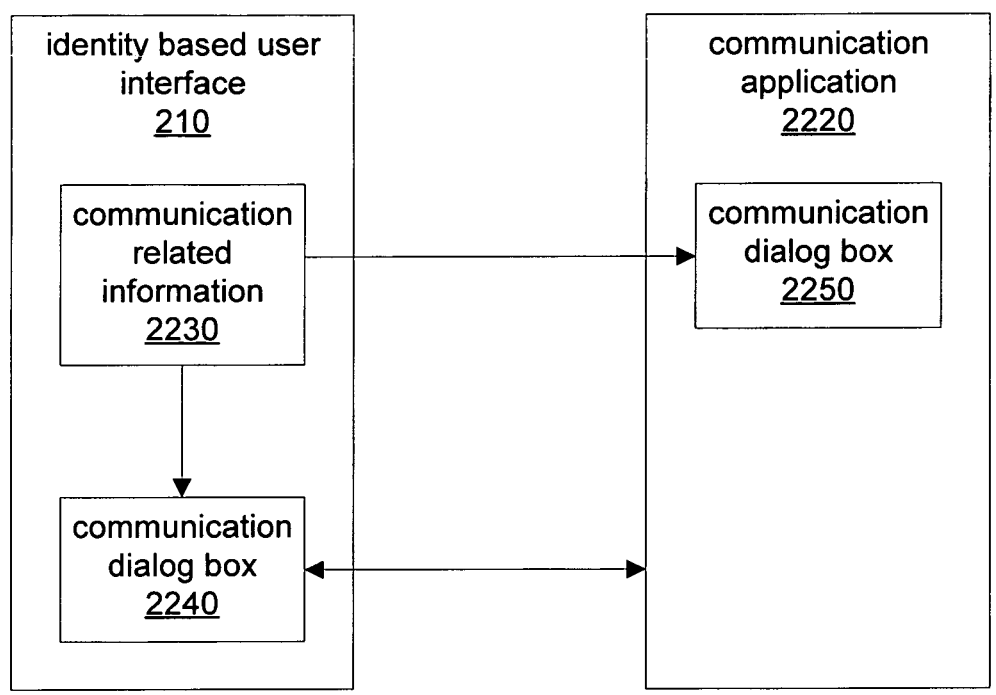
FIG. 22 is a block diagram illustrating an identity based user interface, according to one embodiment.

FIG. 22 is a block diagram illustrating an identity based user interface interacting with a communication application, according to one embodiment. Identity based user interface 210 may, in one embodiment be configured to initiate communication through various communication applications, such as communication application 2220. Communication application 2220 may represent any of various communication related applications, including but not limited to, an e-mail application, an instant messenger application, a telephony application, a calendar application, or a video conferencing application. Identity based user interface 210 may be configured, in one embodiment to allow a user to select both a target identity and a method or mechanism of communication. In response to such a selection, identity based user interface 210 may initiate communication with the selected identity through the selected mechanism, according to one embodiment.

As described above, identity based user interface 210 may communicate via more than one communication application. For example, when implementing orchestrated group communication, identity based user interface 210 may be configured to communicate via different communication applications for different members of a target contact group.

Identity based user interface 210 may initiate communication in various ways according to the specific communication mechanisms supported by various embodiments. For example, in one embodiment, identity based user interface 210 may be configured to interact with communication dialog box 2250 of communication application 2220 in order to supply the identity and communication related information necessary to initiate communication with a selected identity. For example, when implementing orchestrated group communication, identity based user interface 210 may be configured to automatically supply appropriate communication related information for members of a target contact group. In one embodiment, identity based user interface 210 may insert communication information, such as an email address, or multiple members of a contact group, in communication dialog box 2250. For example, when implementing orchestrated group communication to a contact group that includes several email contacts, identity based user interface 210 may use a single email message via an email application, rather than sending individual email messages to each email contact of the target group.

In another embodiment, identity based user interface 210 may be configured to generate and display communication dialog box 2240 allowing a user to input additional communication related information and may then interact with communication application 2220 to initiate the actual communication. For example, a user may use identity based user interface 210 to first select a remote user and then to send an instant message to that remote user. In such an example, according to one embodiment, identity based user interface 210 may generate a dialog box allowing the user to type the instant message to send to the remote user and may then communicate with communication application 2220 or another instant messenger service to send the instant message.

Figure 23:
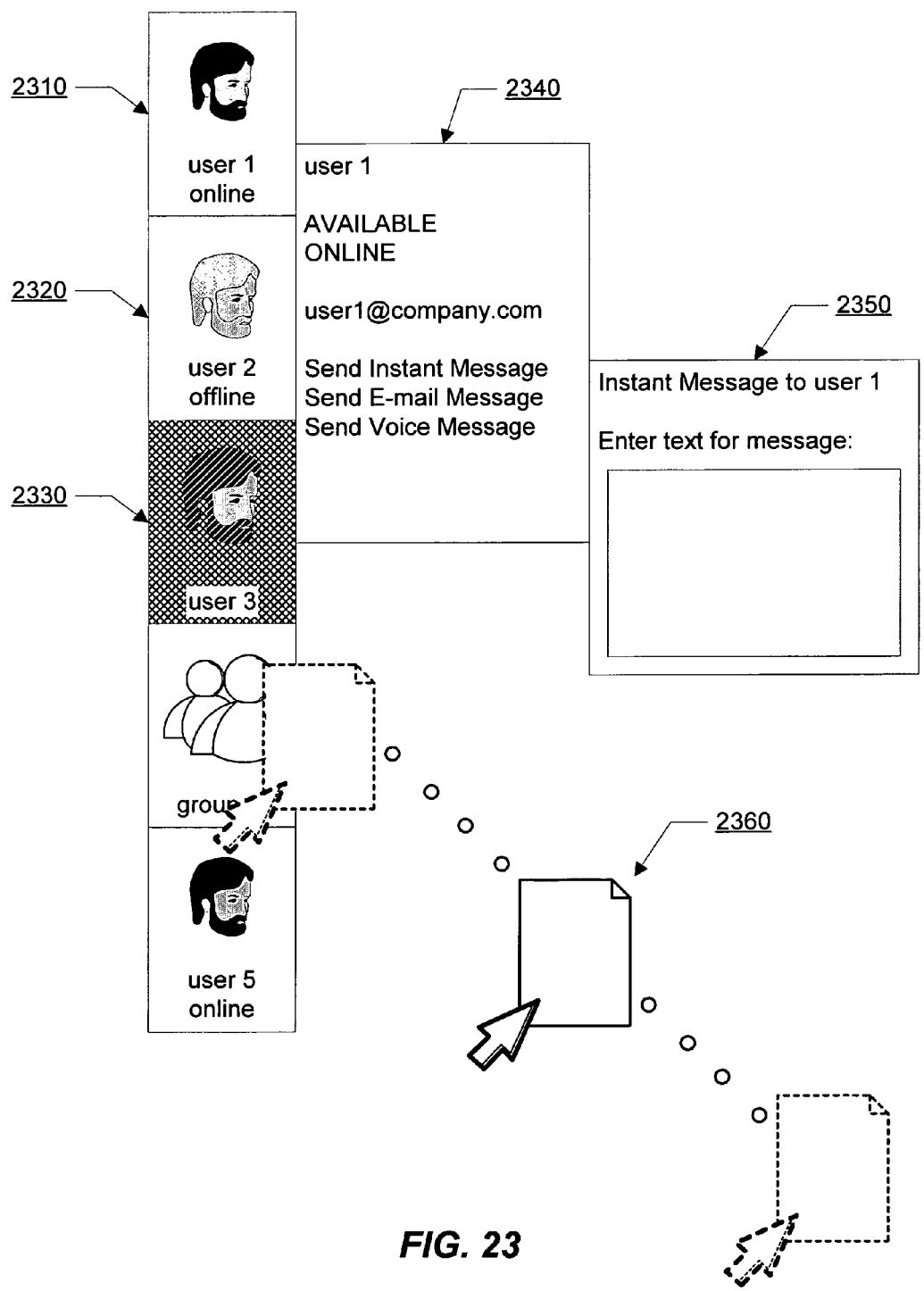
FIG. 23 is a block diagram illustrating, according to one embodiment, a graphical identity based user interface that may serves as an entry point to access various communication mechanisms.

FIG. 23 is a block diagram illustrating, according to one embodiment, a graphical identity based user interface that may serve as an entry point to access various communication mechanisms. According to one embodiment an identity based user interface, such as identity based user interface 210, described herein, may display various graphical user interface elements allowing a user to view various types of identity and communication related information for one or more identities. As described herein, such identity information may include indications of presence, availability, availability, and mechanisms for communicating with each of the identities. For example identity based user interface 210 may, in one embodiment, display one or more graphical elements 2310, 2320; and 2330, each of which may represent a single identity and which may also convey some identity or availability information about the identity. For example, identity based user interface 210 may display a graphical icon 2310 for an identity that displays a name, position, or role associated with the identity or that indicates whether the identity is currently available. Alternatively, identity based user interface 210 may display a single icon representing a group of contacts and may display communication information for the individual members or the group as a whole, according to various embodiments.

Additionally, according to some embodiments, identity based user interface may change or modify graphical icon 2310 to reflect the current presence, availability, or reach-ability for an identity. For example, identity based user interface 210 may, in one embodiment, display an image or graphical icon showing a person on the phone to represent that fact that an identity may be currently on the phone, perhaps based on information from a telephony application. In another example, according to another embodiment, identity based user interface may change the color or flash graphical icon 310 to indication various communication awareness information about an identity, such as to indicate when the identity is online or availability through instant messaging. Other graphical information indicating an identity's presence, availability or reach-ability through particular communication mechanisms or channel may also be displayed as part of graphical icon 2310, either singly or in combination, according to various embodiments.

Further, identity based user interface 210 may respond to user input, perhaps a mouse click, selecting one of the identities by displaying additional, more detailed information, about the identity. For example, in response to a user selecting user1 through graphical icon 2310, perhaps by right clicking with a mouse, identity based user interface 210 may, in one embodiment, display interface element 2340 displaying various types of identity and communication information regarding the selected identity.

In some embodiments, one or more interface elements of 2340 may be selectable by a user, and may be command buttons requesting action by identity based user interface 210. For example, a user may select a button displayed by identity based user interface 210 labeled, "send instant message" and in response identity based user interface 210 may generate or display dialog box 2350 allowing the user to specify the message to send to the selected identity. In another example, a user may be able to drag and drop a file or document 2360 onto an interface element displayed by identity based user interface 210 and identity based user interface 210 may automatically initiate the communication of the file or document to the contact or contacts represented by the displayed interface element. For example, a user may drag and drop a document onto an icon representing a group of contacts, and identity based user interface may implement orchestrated group communication, as described herein, to deliver the document to each member of the group represented by the icon. Thus, in some embodiments, communication to a group of contacts (i.e. orchestrated group communication) may be requested or initiated by a single user action, such as by dragging and dropping a document on to a group icon. In other embodiments, however, other user interface actions may initiate or request orchestrated group communication. For example, in one embodiment, a user may select a group name from a list of defined contact groups. Alternatively, in another embodiment, a user may multiply select individual contacts, thus defining a temporary or ad-hoc contact group as target or recipient of orchestrated group communication.

Figure 24:
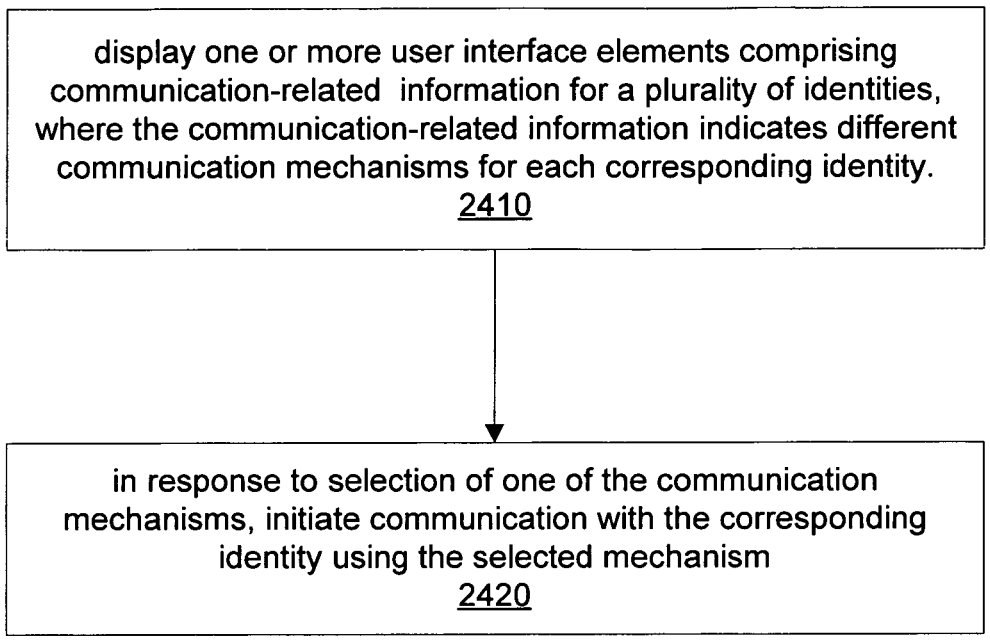
FIG. 24 is a flowchart illustrating, according to one embodiment, a method for implementing an identity based user interface.

FIG. 24 is a flowchart illustrating, according to one embodiment, a method for implementing an identity based user interface. In certain embodiments, an identity based user interface, such as identity based user interface 210 may display an number of interactive user interface elements presenting communication related information for a number of identities and may allow a user to access additional information or to initiate one or more communication related actions through the displayed user interface elements.

In some embodiments, an identity based user interface may display one or more user interface elements comprising communication-related information for a plurality of identities, where the communication related information indicates different communication mechanisms for each corresponding identity, as illustrated by block 2410. In certain embodiments, an identity based user interface, such as identity based user interface 210, may display a number of user interface elements presenting communication-related information about a number of identities, contacts, or users. In one embodiments, identity based user interface 210 may be configured to display an icon or each of the identities. In other embodiments, identity based user interface 210 may display a user interface elements presenting a name for each identity. In such embodiments, identity based user interface may display information for a specific set of identities; the exact number or composition may vary from embodiment to embodiment. For example, in one embodiment, identity based user interface 210 may display information for a core set of identities. In another embodiment, identity based user interface may display a fixed number of recently access identities. In yet another embodiment, identity based user interface 210 may be configured to display information about a fixed set of core identities and in addition, display information for a variable number of recently accessed identities. In some embodiments, identity based user interface 210 may utilize an adaptive contact list to determine the specific identities for which to display communication-related information.

In certain embodiments, identity based user interfaces, such as identity based user interface 120, may, as part of the displayed communication related information, display indications of one or more communication mechanisms for each identity. For example, identity based user interface 210 may display an e-mail address or another indicator that the corresponding identity may be reached through e-mail. Additionally, identity based user interface 210 may present one or more telephone numbers or instant messenger screen names as indications of different way to communication with the identity. In certain embodiments, identity based user interface 210 may not actually display the actual e-mail addresses, telephone numbers, screen names or other communication related addressing information, but instead, may display user interface controls, such as a button labeled "e-mail this identity", that indicate that an identity may be reachable via a specific communication mechanism.

In one embodiment, identity based user interface 210 may in response to selection of one of the communication mechanisms, initiate communication with the corresponding identity using the selected mechanism. In certain embodiments, an identity based user interface may be configured to allow a user to initial communication with an identity according to one of the communication mechanisms. In one embodiment, identity based user interface 210 may allow a user to initiate such a communication via the display user interface controls or other elements indicating the different communications mechanisms.

In one embodiment, identity based user interface 210 may be configured to communication or interact with an identity framework, such as identity framework 220, when initiating communication with an identity. For example, identity based user interface 210 may use identity framework 220 to access a stored, shared identity object including identity or communication information for a selected identity.

Figure 25:
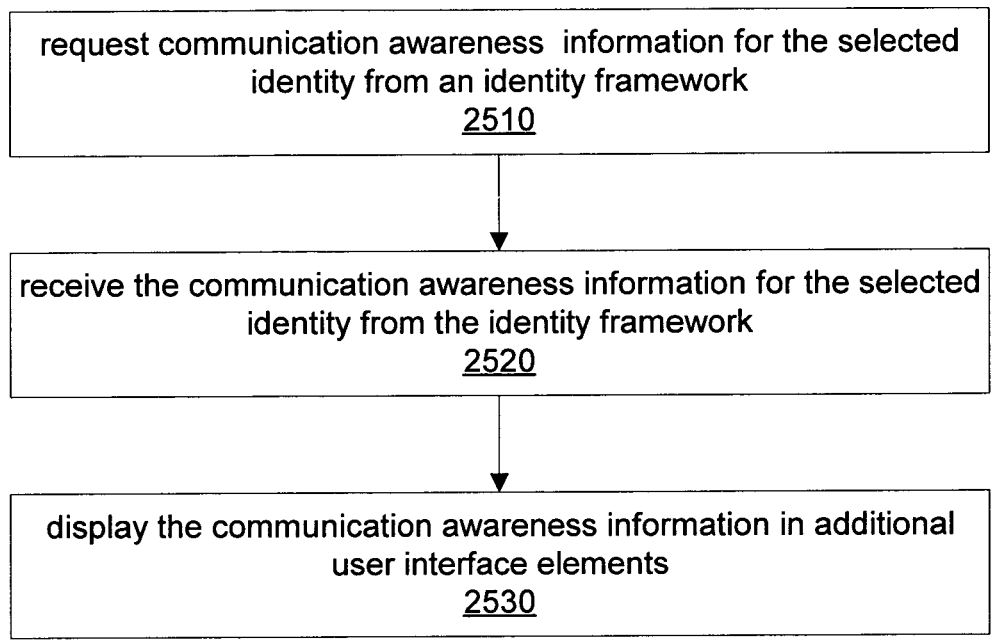
FIG. 25 is a flowchart illustrating, according to one embodiment, a method for incorporating communication awareness information in an identity based user interface.

FIG. 25 is a flowchart illustrating, according to one embodiment, a method for incorporating communication awareness information in an identity based user interface. In some embodiments, identity based user interfaces, such as identity based user interface 210, may be configured to incorporate communication awareness information into the display of communication related information for an identity. In such an embodiment, identity based user interface 210 may request communication awareness information for a selected identity from an identity framework, as illustrated be block 2510 and may in return receive the communication awareness information for the selected identity from the identity framework, as illustrated by block 25. For example, identity based user interface 210 may request communication awareness information for a selected identity from identity framework 220 and identity framework may return the requested communication awareness information for the selected identity. As described herein, an identity framework, such a identity framework 220, may determine such communication awareness information in a number of ways, including requesting it from an remote system, that may be executing an identity framework, associated with the identity.

After receiving the communication awareness information, identity based user interface 210 may display the communication awareness information in additional user interface elements, as illustrated by block 2530. For example, identity based user interface may display an additional box or window that includes more detailed communication related information including the received communication awareness information for the identity, in one embodiment. In another embodiment, identity based user interface 210 may modify already displayed information to reflect the received communication awareness information.

Figure 26:
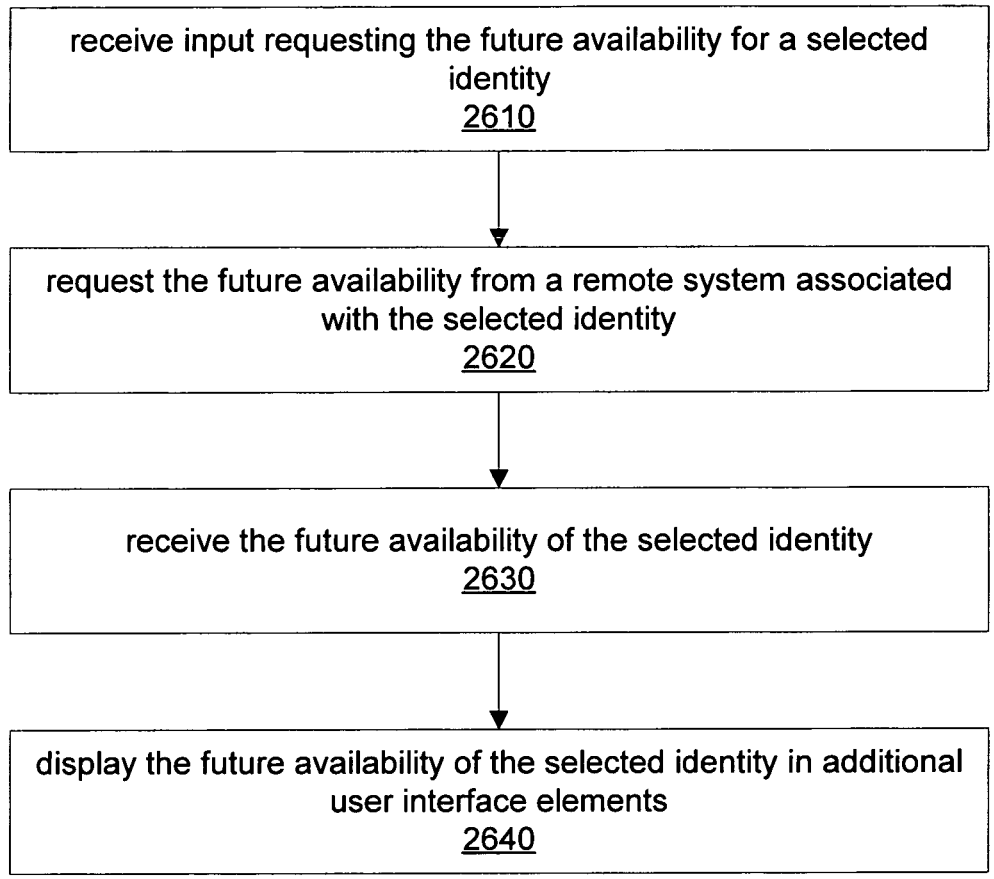
FIG. 26 is a flowchart illustrating, according to one embodiment, a method for incorporating future availability information in an identity based user interface.

FIG. 26 is a flowchart illustrating, according to one embodiment, a method for incorporating future availability information in an identity based user interface. In certain embodiments, an identity based user interface, such as identity based user interface 210 may incorporate information related to the future availability of an identity into the displayed communication related information. In one embodiment, identity based user interface 210 may receive input requesting the future availability for a selected identity, as illustrated by block 2610. For example, identity based user interface 210 may be configured to display information about the future availability of an identity in response to a user selecting an identity or requesting such future availability. In one embodiment, identity based user interface 210 may display those future times that an identity is available via a particular communication mechanism.

In one embodiment, identity based user interface 210 may request the future availability information from a remote system associated with the selected identity, as illustrated be block 2620. In one embodiment, identity based user interface 210 may be configured to request such information about the future availability directly from a remote system associated with the selected identity. In another embodiment, identity based user interface 210 may be configured to request the future availability information from an identity framework executing on a remote system associated with the selected identity. In yet another embodiment, identity based user interface 210 may be configured to request information about the future availability of the selected identity from a calendar or meeting coordination system executing on a remote system—either a central calendar server, or a remote system associated with the selected identity.

Identity based user interface 210 may receive the future availability of the selected identity, as illustrated by block 2630, according to one embodiment. When requesting and receiving the future availability information, identity based user interface 210 may utilize any of a number of inter-process and inter-device communication schemes or protocols.

After receiving the information indicating the future availability of an identity, identity based user interface 210 may display the future availability of the selected identity in additional user interface elements, as illustrated by block 2640. For example, identity based user interface 210 may be configured to display information about the future availability of an identity in response to a user selecting an identity or requesting such future availability. In one embodiment, identity based user interface 210 may display those future times that an identity is available via a particular communication mechanism.

Figure 27:
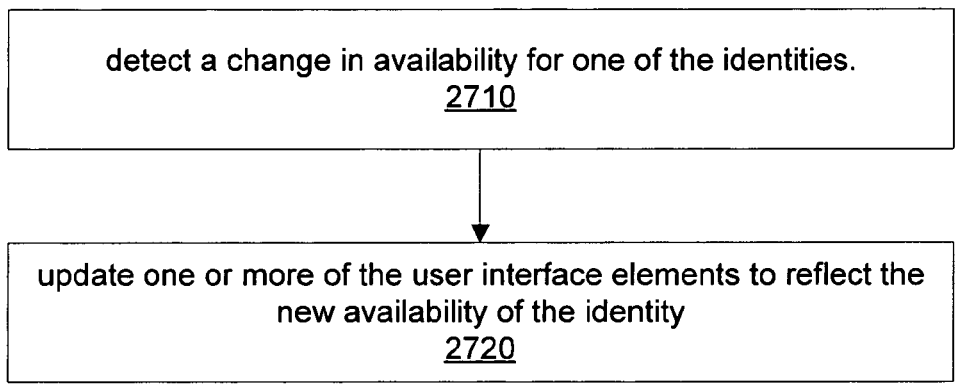
FIG. 27 is a flowchart illustrating, according to one embodiment, a method for updating an identity based user interface based upon changing availability information.

FIG. 27 is a flowchart illustrating, according to one embodiment, a method for updating an identity based user interface based upon changing availability information. In certain embodiments, In one embodiment, identity based user interface 210 may detect a change in availability for one of the identities, as illustrated by block 2710, and may update one or more of the user interface elements to reflect the new availability of the identity. For example, identity based user interface 210 may be configured to periodically request the availability information for identities and may additionally be configured to update displayed user interface elements, such as text or icons, that indicate the availability of a corresponding identity. In one embodiment, identity based user interface may be configured to detect, and update displayed user interface elements corresponding the availability of an identity via one or more specific communication mechanisms. As described herein, identity based user interface 210 may display information indicating one or more mechanisms, such as e-mail addresses, telephone numbers, or screen names, for communicating with an identity and may, in one embodiment, also display information indicating the current availability of an identity through those each of those mechanisms.

Figure 28:
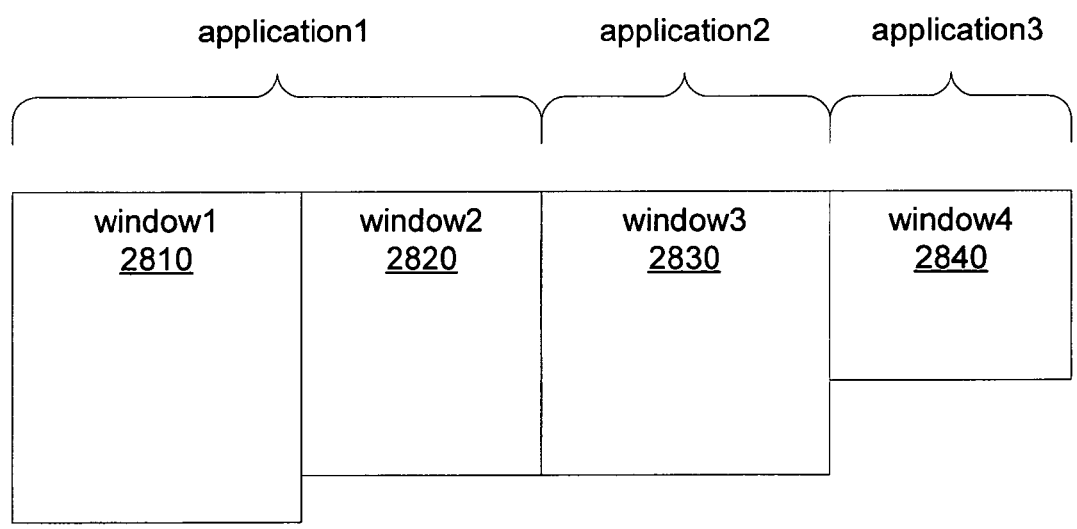
FIG. 28 is a block diagram illustrating, according to one embodiment, contextual placement of user interface elements.

FIG. 28 is a block diagram illustrating, according to one embodiment, contextual placement of user interface elements. In certain embodiments, an application or process may need to display multiple user interface elements, such as menus, windows and dialog boxes, during the execution of a single user task, such as a communication related task. When displaying multiple user interface elements as part of a single, possibly complex, user task, an application, such as identity based user interface 210, may locate newly generated or displayed user interface elements in the context of the user interface elements that initiated the generation or display of the new user interface elements. For example, as illustrated in FIG. 14, identity based user interface may, in one embodiment, display or generate window1 2810 and window2 2820 and locate window2 2820 in the same context as window1 2810, such as by aligning the top of window2 2820 with the top of window1 2810. Additionally, in one embodiment, additional user interface elements, such as window3 2830, and window4 2840 may be generated or displayed in the same context as windows 1 and 2, by aligning the tops of all four windows, as illustrated in FIG. 14. In certain embodiments, all the user interface elements, such as windows1-4 in FIG. 14, may be part of a single application, such as identity based user interface 210. But in other embodiments, the various user interface elements may be part of different applications. For example, in one embodiment, window1 2810 and window2 2820 may be part of a single application1, such as identity based user interface 210, while window3 2830 may be part of application2 and window4 2840 may be part of application3. When multiple user interface elements from different applications are located within the same context of a single user task, the contextual relationship between the different windows may be demonstrated in various ways according to different embodiments. For instance, in one embodiment, all four windows may be physically aligned to show that they are part of the same context. In another embodiment, however, color, icons, or other informative or decorative devices may be used to show that different user interface elements are in the same context.

Figure 29:
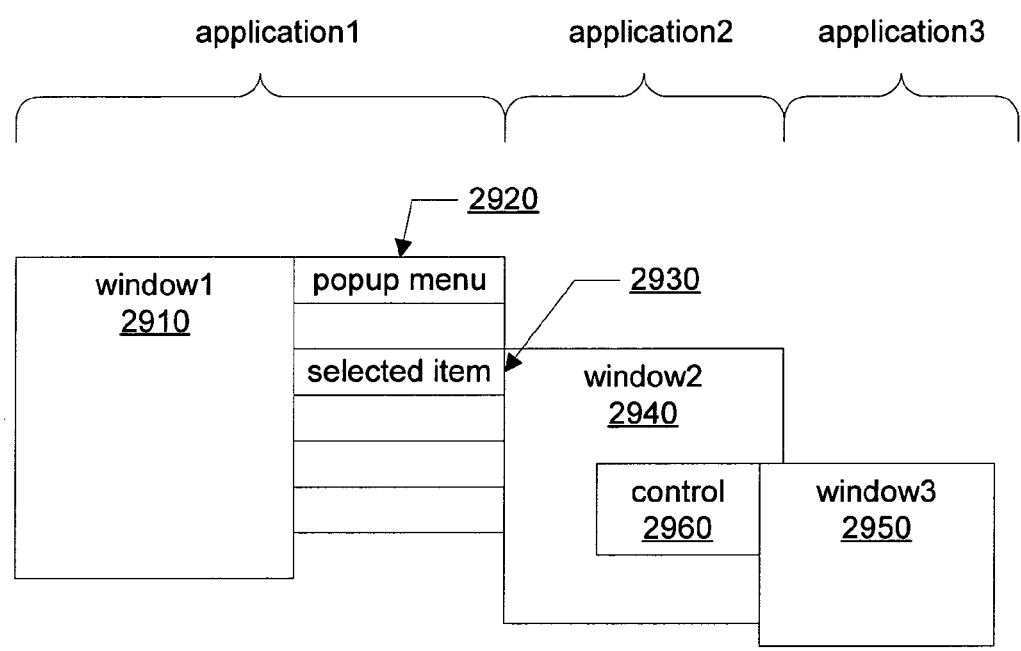
FIG. 29 is a block diagram illustrating task related contextual placement of user interface elements, according to one embodiment.

FIG. 29 is a block diagram illustrating task related contextual placement of user interface elements, according to one embodiment. When placing user interface elements within the same task related context, an application, such as identity based user interface 210 may locate new user interface elements, such as windows, dialog boxes, or pop-up menus, next to or proximate to a feature of an existing user interface element, according to certain embodiments. For example, as illustrated in FIG. 29 and according to one embodiment, popup menu 2920 may be aligned with window1 2910 as part of single user task, perhaps a communication or identity related task. In such an example, a user may have selected one of the items of the popup menu that results in the generation or display of window2 2940. In one embodiment, identity based user interface 210 may locate window2 2940 such that it is aligned with the selected menu item of popup menu 2920 that resulted in the generation or display of window2 2940. In another embodiment, a user interface sub-element, button or other control, such as control 2960, may receive input resulting in the generation or display of window3 2950 and identity based user interface 210 may locate window3 2950 in the context of control 2960, as illustrated in FIG. 15. When locating a new user interface element, such as window3 2950, in the same context as a control that initiating the generation of the new user interface element, an application, such as identity based user interface 210, may demonstrate the contextual relationship between the two user interface elements, such as control 2960 and window3 2950 in various ways according to different embodiments. For instance, in one embodiment, the tops of the two elements may be physically aligned. In another embodiment, color or other graphical features may be used to demonstrate the contextual relationship between the two elements.

Figure 30:
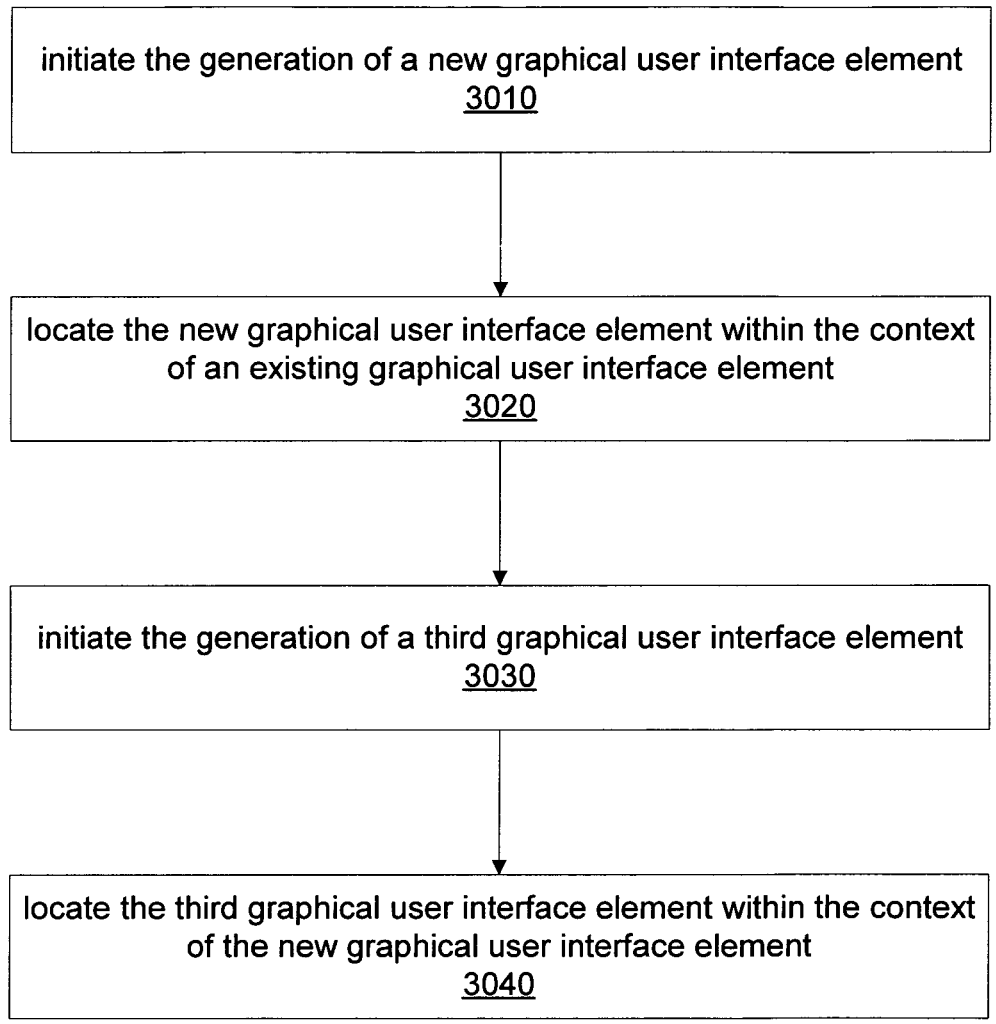
FIG. 30 is a flowchart illustrating, according to one embodiment, a method for implementing contextual placement of user interface elements.

FIG. 30 is a flowchart illustrating, according to one embodiment, a method for implementing contextual placement of user interface elements. In one embodiment, an application utilizing contextual placement, such as identity based user interface 210, may initiate the generation of a new graphical user interface element, as illustrated by block 3010 and may also locate the new graphical user interface element within the context of an existing graphical user interface element, as illustrated by block 3020. For example, such an application may allow a user to initiate a task, possibly an identity based task and may generate one or more user interface elements for the task. For instance, in one embodiment, identity based user interface 210, may display a second user interface element, such as a dialog box, or pop-up menu, and may locate the second user interface element in the context of the first user interface element. For example, in one embodiment, identity based user interface 210 may first display a set of icons, each corresponding to one identity, and may, in response to user input selecting one of the icons, display a second user interface element, perhaps a pop-up menu, and may locate that pop-up menu next to the selected icon to inform the user that the pop-up menu and icon are both part of the same context or task. Additionally, in some embodiments, identity based user interface 210 may initiate the generation of a user interface element of another application, perhaps a communication application, such as an instant messenger or e-mail application, and may locate it within the context of an existing user interface element. As illustrated by bock 3030, in one embodiment, identity based user interface 210 may initiate the generation of a third graphical user interface element and may locate the third graphical user interface element within the context of the new graphical user interface element, as illustrated by block 3040. For example, in response to input selecting an identity from a first displayed user interface element, identity based user interface 210 may display an additional window or dialog box presenting additional information, such as more detailed communication related information for the selected identity and may locate such an additional window next to display information about the selected identity. Additionally, in another embodiment, identity based user interface 210 may locate a third element next to a user interface control of an existing dialog, window or other user interface element such that it is apparent from the location of the third user interface element that the user interface control was used to initiate the generate of the third user interface element. For instance, identity based user interface 210 may, in response to input selecting an identity, display a window presenting controls representing different mechanisms for communication with the selected identity, and in response to input selecting one of the mechanisms, initiate the generation of a third user interface element, such as a dialog box, and may locate the third user interface element in the context of the selected mechanism.

In one embodiment, identity based user interface 210 may locate a user interface element in the context of another user interface element by physically locating one interface element near or adjacent to the other. In another embodiment, identity based user interface element 210 may user colors or other decoration on the user interface elements to demonstrate that they are in the same context. In yet another embodiment, identity based user interface 210 may locate a new user interface element next a control or sub-element of an existing user interface element that received the input resulting in the generation of the new user interface element. For instance, the top of a new dialog box may be aligned with the button that initiated the tasks requiring the new dialog box, according to one embodiment. In certain embodiments, the various user interface elements that are located in the context of each other may be part of different applications. For example, identity based user interface 210 may present several user interface elements from different applications as part of a single user task, such as communicating with one or more identities, or setting up an online meeting.

Figure 31:
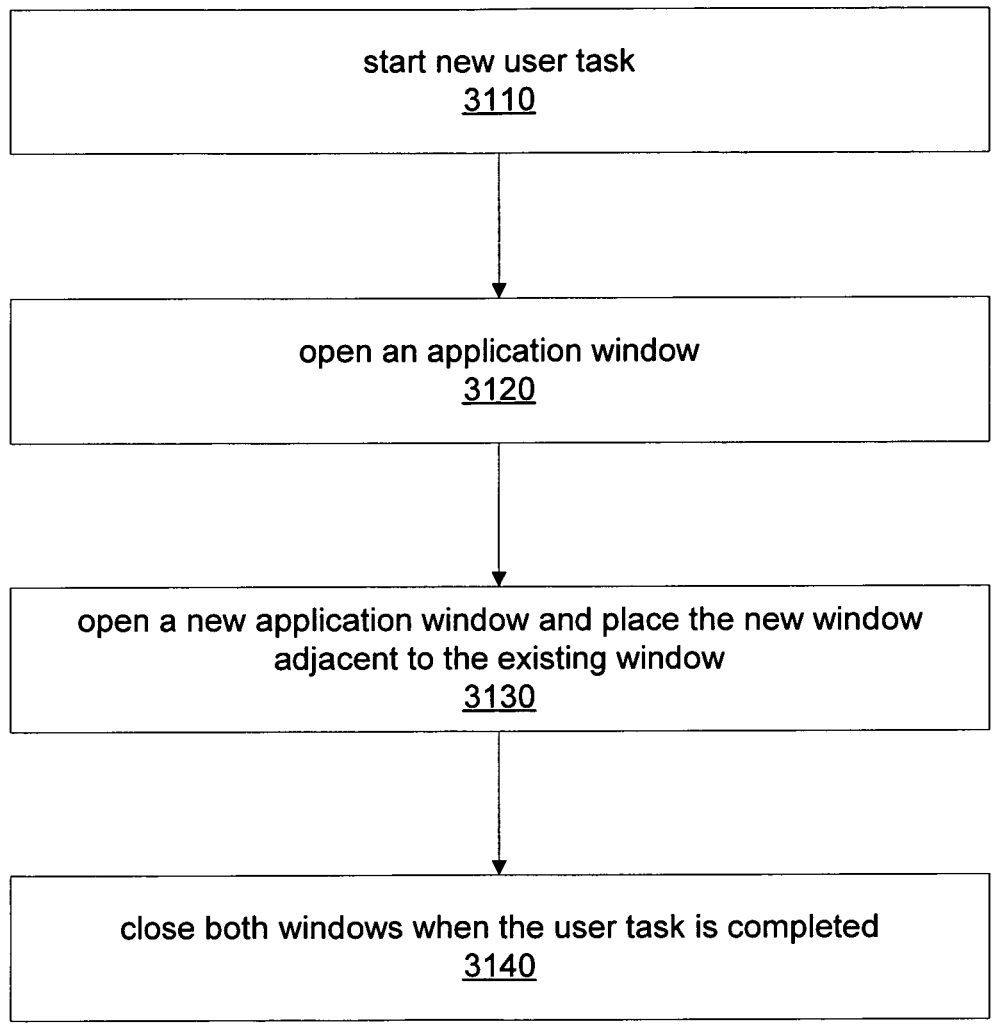
FIG. 31 is a flowchart illustrating, according to one embodiment, a method for closing multiple, task-related, user interface elements when a single user task is completed.

FIG. 31 is a flowchart illustrating, according to one embodiment, a method for closing multiple, task-related, user interface elements when a single user task is completed. In one embodiment, an application, such as identity based user interface 210, may, as illustrated by block 3110, start a new user task, such as sending an e-mail message to a selected identity. As part of such a task, identity based user interface 210 may open an application window, as illustrated by block 3120, in one embodiment. Such an application window may be part of identity based user interface, or may be part of a separate application, according to various embodiments. Also as part of the user task, identity based user interface 210 may open a new application window and place the new window adjacent to the existing window, as illustrated by block 3130, in one embodiment. For example, identity based user interface 210 may, in certain embodiments, employ multiple application windows in support of a single user task and as described herein, may locate or present them all within a single context. When the user task has been completed, identity based user interface 210 may close both application windows, as illustrated by block 3140. For example, identity based user interface may have displayed multiple application windows allowing a user to perform a single user task, such as sending an instant message to a selected identity, and may close all the application windows associated with that user task when the task is completed. In this way, an application, such as identity based user interface 210, may reinforce the fact that the various application windows are part of the same task and context by closing them all together when the task is completed.

Figure 32:
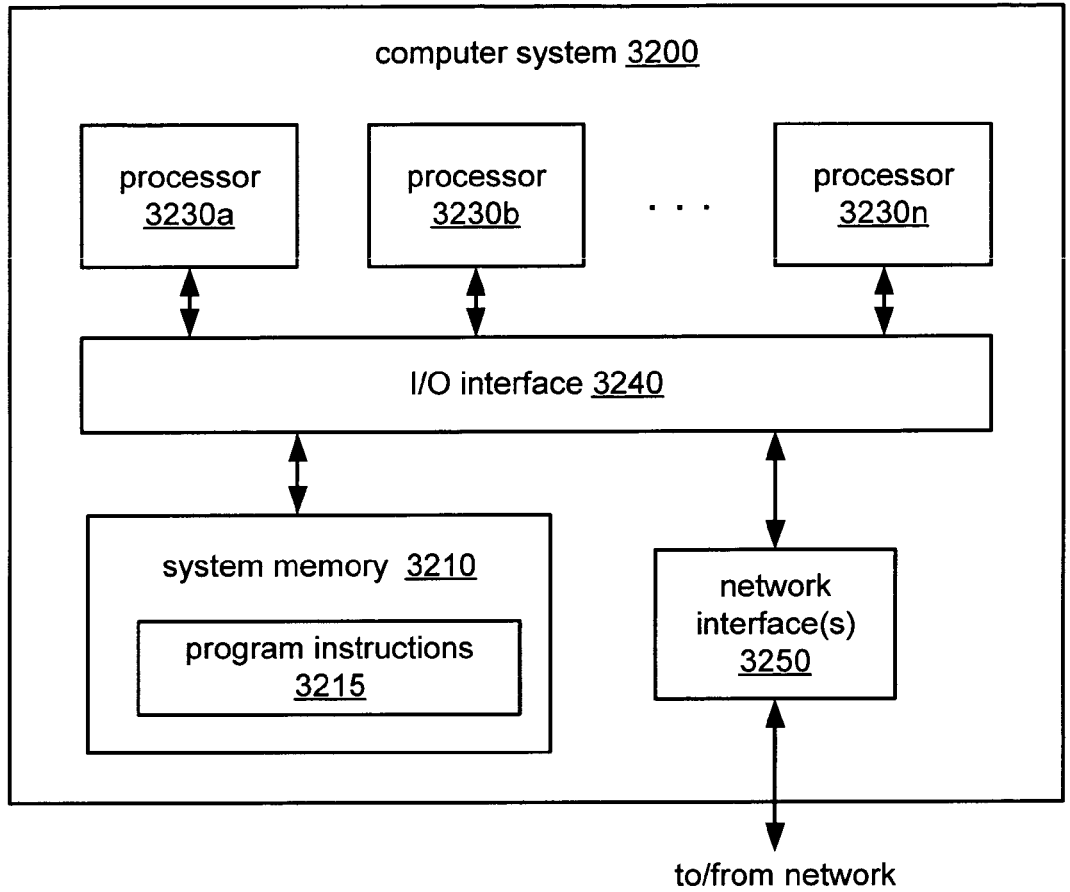
FIG. 32 is a block diagram illustrating a computer system suitable for implementing various embodiments of identity based computing.

FIG. 32 is a block diagram illustrating an embodiment of a computer system usable to implement orchestrated group communication, as described herein. In the illustrated embodiment, computer system 3200 may include one or more processors 3230 coupled to a system memory 3210 via an input/output (I/O) interface 3240. Computer system 3200 may further include one or more network interfaces 3250, also coupled to I/O interface 3240. In various embodiments, computer system 3200 may be a uniprocessor system including one processor 3230, or, in other embodiments, computer system 3200 may be a multiprocessor system including several processors 3230 (e.g., two, four, eight, or another suitable number). Processors 3230 may be any suitable processors capable of executing instructions. For example, in various embodiments, processors 3230 may be general-purpose or embedded processors implementing any of a variety of instruction set architectures (ISAs), such as the x86, PowerPC, SPARC, or MIPS ISAs, or any other suitable ISA. In multiprocessor systems, each of processors 3230 may commonly, but not necessarily, implement the same ISA.

System memory 3210 may be configured to store instructions and data accessible by processor(s) 3230. In various embodiments, system memory 3210 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above regarding orchestrated group communication, are shown stored within system memory 3210 as program instructions 3215.

In one embodiment, I/O interface 3240 may be configured to coordinate I/O traffic between processor(s) 3230, system memory 3210, and any peripheral devices in the device, including network interface(s) 3250 or other peripheral interfaces. In some embodiments, I/O interface 3240 may perform any necessary protocol, timing or other data transformations to convert data signals from one component (e.g., system memory 3210) into a format suitable for use by another component (e.g., processor 3230). In some embodiments, I/O interface 3240 may include support for devices attached through various types of peripheral buses, such as a variant of the Peripheral Component Interconnect (PCI) bus standard or the Universal Serial Bus (USB) standard, for example. In some embodiments, the function of I/O interface 3240 may be split into two or more separate components, such as a north bridge and a south bridge, for example. Also, in some embodiments some or all of the functionality of I/O interface 3240, such as an interface to system memory 3210, may be incorporated directly into processor 3230.

Network interface(s) 3250 may be configured to allow data to be exchanged between computer system 3200 and other devices attached to a network, such as other computer systems, for example. Network interface(s) 3250 may commonly support one or more wireless networking protocols (e.g., Wi-Fi/IEEE 802.11, or another wireless networking standard). However, in various embodiments, network interface(s) 3250 may support communication via any suitable wired or wireless general data networks, such as other types of Ethernet network, for example. Additionally, network interface(s) 3250 may support communication via telecommunications/telephony networks such as analog voice networks or digital fiber communications networks, via storage area networks such as Fibre Channel SANs, or via any other suitable type of network and/or protocol.

In some embodiments, system memory 3210 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 3200 via I/O interface 3240. A computer-accessible medium may also include any volatile or non-volatile media such as RAM (e.g. SDRAM, DDR SDRAM, RDRAM, SRAM, etc.), ROM, etc, that may be included in some embodiments of computer system 3200 as system memory 3210 or another type of memory. Further, a computer-accessible medium may store program instructions capable of being transmitted across transmission media or signals such as electrical, electromagnetic, or digital signals, conveyed via a communication medium such as network 400, another network, and/or a wireless link, such as may be implemented via network interface(s) 3250.

Network 400, as illustrated in FIG. 4, may comprise any of various network technologies according to various embodiments. Network 400 may be a local area network, wide area network, intranet network, Internet network, or many other types of network. Network 400 may, in some embodiments, be designed to be continuously available (although network outages may occur), or may be intermittent (e.g. a modem connection made between a computer system in a user's home and a computer system in a user's workplace). Network 400 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 400 may be configured according to a number of different network topologies including, but not limited to, star, token-ring, token-bus, scatternet, dual-ring, mesh, etc. Network 400 may also be configured to utilize a combination of different networking technologies and/or topologies. Additionally, network 400 may comprise shared storage or shared memory for communicating between different computer systems or between processes within the same computer system, according to some embodiments.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Although the embodiments above have been described in detail, numerous variations and modifications will become apparent once the above disclosure is fully appreciated. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A device, comprising:
a processor; and
a memory coupled to the processor, wherein the memory comprises program instructions configured to:
receive input requesting communication of specific information to a particular group of people, wherein the particular group of people is represented by an identifier of a group contact, wherein the group contact comprises a plurality of individual contacts, wherein each of the plurality of individual contacts identifies a person, multiple people, or an organization, and wherein for at least one of the individual contacts, the person, multiple people, or organization identified by the individual contact has a capability to receive information through a plurality of communication mechanisms;
in response to said input, for each of the plurality of individual contacts of the group contact:
programmatically determine an initial communication mechanism for communicating the specific information to the person, multiple people, or organization identified by the individual contact; and
deliver the specific information to the person, multiple people, or organization identified by the individual contact via the determined initial communication mechanism;
wherein for the at least one of the plurality of individual contacts, said programmatically determining the initial communication mechanism for communicating the specific information to the person, multiple people, or organization identified by the individual contact comprises programmatically pre-determining the initial communication mechanism for communicating the specific information to the person, multiple people, or organization identified by the individual contact, wherein pre-determining the initial communication mechanism comprises:
prior to attempting to deliver the specific information to the person, multiple people, or organization identified by the individual contact, determining whether the person, multiple people, or organization identified by the individual contact has a capability to receive information via a particular one of the plurality of communication mechanisms and is currently available to receive information via the particular one of the plurality of communication mechanisms; and
in response to determining that the person, multiple people, or organization identified by the individual contact has the capability to receive information via the particular one of the plurality of communication mechanisms and is currently available to receive information via the particular one of the plurality of communication mechanisms, selecting the particular one of the plurality of communication mechanisms as the initial communication mechanism for the individual contact; and
wherein, for delivering the specific information to the particular group of people, the determined initial communication mechanisms for communicating the specific information to the people, groups of people, or organizations identified by the plurality of individual contacts comprise at least two different communication mechanisms, wherein the specific information is delivered to one or more of the people, groups of people, or organizations identified by the plurality of individual contacts via one of the at least two different communication mechanisms and delivered to one or more others of the people, groups of people, or organizations identified by the plurality of individual contacts via another one of the at least two different communication mechanisms.

2. The device of claim 1, wherein in response to determining that the at least one of the plurality of individual contacts is not currently available via the particular one of the plurality of communication mechanisms, the program instructions are configured to:
programmatically determine a different communication mechanism via which the at least one of the plurality of individual contacts is available; and
use the different communication mechanism via which the at least one of the plurality of individual contacts is available as the determined initial communication mechanism for the at least one of the plurality of individual contacts.

3. The device of claim 1, wherein, in delivering the specific information via the determined initial communication mechanism, the program instructions are configured to deliver the specific information via a communication application configured to communicate via the determined initial communication mechanism.

4. The device of claim 1, wherein, in programmatically determining an initial communication mechanism, the program instructions are configured to request a preferred communication mechanism from an identity framework for the person, multiple people, or organization identified by the individual contact, and wherein the identity framework is configured to maintain availability information for the people, groups of people, or organizations identified by one or more individual contacts.

5. The device of claim 4, wherein, in requesting a preferred communication mechanism from an identity framework, the program instructions are configured to communicate with the identity framework across a network.

6. The device of claim 1, wherein, in programmatically determining an initial communication mechanism, the program instructions are configured to access a shared identity object for the individual contact, wherein the shared identity object stores aggregated identity and communication information for the person, multiple people, or organization identified by the individual contact.

7. The device of claim 1, wherein, in programmatically determining an initial communication mechanism, the program instructions are further configured to determine the initial communication mechanism further based on one or more user-defined polices indicating one or more preferred communication mechanisms for communicating the specific information according to a content type of the specific information.

8. The device of claim 1, wherein the program instructions are further configured to display one or more user interface elements representing the particular group of people, wherein, in receiving input, the program instructions are configured to receive input via one or more of the one or more displayed user interface elements.

9. The device of claim 8, wherein, in receiving user input, the program instructions are further configured to receive input identifying one or more files to be communicated to the particular group of people via one or more of the one or more user interface elements.

10. The device of claim 9, wherein, in receiving input identifying the one or more files, the program instructions are further configured to receive input indicating that the one or more files were dragged and dropped by a user onto one or more of the one or more user interface elements.

11. The device of claim 1, wherein the program instructions are further configured to receive user input via a single user interface action specifying the particular group of people to whom the specific information is to be communicated.

12. The device of claim 1, wherein the program instructions are further configured to:
maintain one or more group contacts, wherein each of the one or more group contacts comprises a plurality of individual contacts; and
wherein, in receiving input requesting communication of the specific information to a particular group of people, the program instructions are configured to receive input requesting communication of the specific information to a group of people represented by an identifier of one or more of the one or more maintained group contacts.

13. The device of claim 1, wherein, in programmatically determining an initial communication mechanism, the program instructions are configured to determine the initial communication mechanism further based on one or more user-defined policies indicating one or more preferred communication mechanisms for one or more of the plurality of individual contacts.

14. The device of claim 1, wherein the specific information to be communicated comprises one or more files.

15. The device of claim 1, wherein the specific information to be communicated comprises one or more of textual information, audio information, video information, graphic information, or executable information.

16. The device of claim 1, wherein the determined initial communication mechanism for each of the plurality of individual contacts comprises one of: email, instant messaging, text messaging, telephone, video-conferencing, or FTP.

17. The device of claim 1, wherein the program instructions are further configured to deliver additional information, associated with the specific information to be communicated, to at least one of the plurality of individual contacts via a second communication mechanism that is different from the determined initial communication mechanism for the at least one of the plurality of individual contacts.

18. A method, comprising:
receiving input requesting communication of specific information to a particular group of people, wherein the particular group of people is represented by an identifier of a group contact, wherein the group contact comprises a plurality of individual contacts, wherein each of the plurality of individual contacts identifies a person, multiple people, or an organization, and wherein for at least one of the individual contacts, the person, multiple people, or organization identified by the individual contact has a capability to receive information through a plurality of communication mechanisms;
in response to said input, for each of the plurality of individual contacts of the group contact:
programmatically determining an initial communication mechanism for communicating the specific information to the person, multiple people, or organization identified by the individual contact; and
delivering the specific information to the person, multiple people, or organization identified by the individual contact via the determined initial communication mechanism;
wherein for the at least one of the plurality of individual contacts, said programmatically determining the initial communication mechanism for communicating the specific information to the person, multiple people, or organization identified by the individual contact comprises programmatically pre-determining the initial communication mechanism for communicating the specific information to the person, multiple people, or organization identified by the individual contact, wherein pre-determining the initial communication mechanism comprises:
prior to attempting to deliver the specific information to the person, multiple people, or organization identified by the individual contact, determining whether the person, multiple people, or organization identified by the individual contact has a capability to receive information via a particular one of the plurality of communication mechanisms and is currently available to receive information via the particular one of the plurality of communication mechanisms; and
in response to determining that the person, multiple people, or organization identified by the individual contact has the capability to receive information via the particular one of the plurality of communication mechanisms and is currently available to receive information via the particular one of the plurality of communication mechanisms, selecting the particular one of the plurality of communication mechanisms as the initial communication mechanism for the individual contact; and wherein, for delivering the specific information to the particular group of people, the determined initial communication mechanisms for communicating the specific information to the people, groups of people, or organizations identified by the plurality of individual contacts comprise at least two different communication mechanisms, wherein the specific information is delivered to one or more of the people, groups of people, or organizations identified by the plurality of individual contacts via one of the at least two different communication mechanisms and delivered to one or more others of the people, groups of people, or organizations identified by the plurality of individual contacts via another one of the at least two different communication mechanisms.

19. The method of claim 18, wherein for another one of the plurality of individual contacts said programmatically determining an initial communication mechanism comprises:

prior to attempting to deliver the specific information to the other individual contact, determining whether a person, multiple people, or organization identified by the other individual contact has a capability to receive information via a particular one of the plurality of communication mechanisms and is currently available to receive information via the particular one of a plurality of communication mechanisms; and in response to determining that the person, multiple people, or organization identified by the other individual contact is not currently available to receive information via the particular one of the plurality of communication mechanisms:

determining a communication mechanism for the other individual contact via which the person, multiple people, or organization identified by the other individual contact is currently available to receive information; and using the communication mechanism via which the person, multiple people, or organization identified by the other individual contact is available as the determined initial communication mechanism for the other individual contact.

20. A non-transitory, computer accessible medium, comprising program instructions configured to implement:

receiving receive input requesting communication of specific information to a particular group of people, wherein the particular group of people is represented by an identifier of a group contact, wherein the group contact comprises a plurality of individual contacts, wherein each of the plurality of individual contacts identifies a person, multiple people, or an organization, and wherein for at least one of the individual contacts, the person, multiple people, or organization identified by the individual contact has a capability to receive information through a plurality of communication mechanisms;

in response to said input, for each of the plurality of individual contacts of the group contact:

programmatically determining an initial communication mechanism for communicating the specific information to the person, multiple people, or organization identified by the individual contact; and delivering the specific information to the person, multiple people, or organization identified by the individual contact via the determined initial communication mechanism;

wherein for the at least one of the plurality of individual contacts, said programmatically determining the initial communication mechanism for communicating the specific information to the person, multiple people, or organization identified by the individual contact comprises programmatically pre-determining the initial communication mechanism for communicating the specific information to the person, multiple people, or organization identified by the individual contact, wherein pre-determining the initial communication mechanism comprises:

prior to attempting to deliver the specific information to the person, multiple people, or organization identified by the individual contact, determining whether the person, multiple people, or organization identified by the individual contact has a capability to receive information via a particular one of the plurality of communication mechanisms and is currently available to receive information via the particular one of the plurality of communication mechanisms; and in response to determining that the person, multiple people, or organization identified by the individual contact has the capability to receive information via the particular one of the plurality of communication mechanisms and is currently available to receive information via the particular one of the plurality of communication mechanisms, selecting the particular one of the plurality of communication mechanisms as the initial communication mechanism for the individual contact; and wherein, for delivering the specific information to the particular group of people, the determined initial communication mechanisms for communicating the specific information to the people, groups of people, or organizations identified by the plurality of individual contacts comprise at least two different communication mechanisms, wherein the specific information is delivered to one or more of the people, groups of people, or organizations identified by the plurality of individual contacts via one of the at least two different communication mechanisms and delivered to one or more others of the people, groups of people, or organizations identified by the plurality of individual contacts via another one of the at least two different communication mechanisms.

21. The non-transitory, computer accessible medium of claim 20, wherein for another one of the plurality of individual contacts said programmatically determining an initial communication mechanism comprises:

prior to attempting to deliver the specific information to the other individual contact, determining whether a person, multiple people, or organization identified by the other individual contact has a capability to receive information via a particular one of the plurality of communication mechanisms and is currently available to receive information via the particular one of a plurality of communication mechanisms; and in response to determining that the person, multiple people, or organization identified by the other individual contact is not currently available to receive information via the particular one of the plurality of communication mechanisms:

determining a communication mechanism for the other individual contact via which the person, multiple people, or organization identified by the other individual contact is currently available to receive information; and using the communication mechanism via which the person, multiple people, or organization identified by the other individual contact is available as the determined initial communication mechanism for the other individual contact.

\* \* \* \* \*

UNITED STATES PATENT AND TRADEMARK OFFICE
CERTIFICATE OF CORRECTION

PATENT NO. : 8,886,243 B1  
APPLICATION NO. : 11/124305  
DATED : November 11, 2014  
INVENTOR(S) : Pabla et al.

It is certified that error appears in the above-identified patent and that said Letters Patent is hereby corrected as shown below:

In The Specification,

In column 28, line 10, delete "and or" and insert -- and/or --, therefor.

Signed and Sealed this
Twenty-third Day of June, 2015

Michelle K. Lee
*Director of the United States Patent and Trademark Office*